United States Patent
Jin et al.

(10) Patent No.: US 11,671,833 B2
(45) Date of Patent: Jun. 6, 2023

(54) CELLULAR SERVICE ACCOUNT TRANSFER AND AUTHENTICATION

(71) Applicant: Apple Inc., Cupertino, CA (US)

(72) Inventors: Sherman X. Jin, Santa Clara, CA (US); Raj S. Chaugule, Santa Clara, CA (US); Anish Kumar Goyal, Milpitas, CA (US); Li Li, Los Altos, CA (US); Rafael L. Rivera-Barreto, Santa Clara, CA (US); Samy Touati, Pleasanton, CA (US); Rohan C. Malthankar, San Jose, CA (US)

(73) Assignee: Apple Inc.

( * ) Notice: Subject to any disclaimer, the term of this patent is extended or adjusted under 35 U.S.C. 154(b) by 0 days.

(21) Appl. No.: 18/049,271

(22) Filed: Oct. 24, 2022

(65) Prior Publication Data

US 2023/0075591 A1    Mar. 9, 2023

Related U.S. Application Data

(63) Continuation of application No. 17/176,167, filed on Feb. 15, 2021, now Pat. No. 11,483,711, which is a
(Continued)

(51) Int. Cl.
*H04W 12/43* (2021.01)
*H04W 76/14* (2018.01)
(Continued)

(52) U.S. Cl.
CPC ......... *H04W 12/43* (2021.01); *H04L 63/0853* (2013.01); *H04W 8/205* (2013.01);
(Continued)

(58) Field of Classification Search
CPC .... H04W 76/14; H04W 8/205; H04L 63/0853
See application file for complete search history.

(56) References Cited

U.S. PATENT DOCUMENTS

| 10,194,313 | B1 | 1/2019 | Karimli et al. |
| 2008/0261561 | A1 | 10/2008 | Gehrmann |
| 2012/0115441 | A1 | 5/2012 | Schell |
| 2012/0260090 | A1 | 10/2012 | Hauck et al. |

(Continued)

FOREIGN PATENT DOCUMENTS

CN          104813634 A        7/2015

OTHER PUBLICATIONS

Chinese Application for Invention No. 201911036926.5—First Office Action dated Mar. 1, 2023.

*Primary Examiner* — Ernest G Tacsik
(74) *Attorney, Agent, or Firm* — Dickinson Wright RLLP

(57) ABSTRACT

Embodiments described herein relate to transfer of credentials between two mobile wireless devices that are within proximity of each other, via a secure local connection, or via a network-based cloud service, where the two mobile wireless devices are not in proximity to each other. Transfer of credentials can include communication between a source device, a target device, and/or one more network-based servers, which can include mobile network operator (MNO) managed servers, such as an entitlement server, a web-sheet server, an authentication server, a provisioning server, a subscription management data preparation (SM-DP+) server, a home subscriber server (HSS), and/or an authentication server, as well as third-party managed servers, such as a cloud service server and/or an identification services server. Authentication can be based at least in part on one or more tokens and/or a trust flag obtained by the source device and provided to the target device.

20 Claims, 25 Drawing Sheets

Related U.S. Application Data continuation of application No. 16/667,617, filed on Oct. 29, 2019, now Pat. No. 10,924,921.

(60) Provisional application No. 62/752,298, filed on Oct. 29, 2018.

(51) Int. Cl.
    *H04L 9/40*         (2022.01)
    *H04W 8/20*         (2009.01)
    *H04W 12/42*       (2021.01)
    *H04W 12/50*       (2021.01)
    *H04W 12/069*      (2021.01)

(52) U.S. Cl.
    CPC ......... *H04W 12/069* (2021.01); *H04W 12/42* (2021.01); *H04W 12/50* (2021.01); *H04W 76/14* (2018.02)

(56) References Cited

U.S. PATENT DOCUMENTS

| | | |
|---|---|---|
| 2013/0290714 A1 | 10/2013 | Hans et al. |
| 2014/0143826 A1 | 5/2014 | Sharp et al. |
| 2014/0357229 A1 | 12/2014 | Lee et al. |
| 2015/0237496 A1 | 8/2015 | Gao et al. |
| 2015/0311934 A1 | 10/2015 | Jang et al. |
| 2016/0050557 A1 | 2/2016 | Park et al. |
| 2016/0150400 A1* | 5/2016 | Cha .................. H04M 1/0266 455/418 |
| 2016/0164883 A1 | 6/2016 | Li et al. |
| 2016/0241564 A1 | 8/2016 | Järvinen et al. |
| 2017/0064753 A1 | 3/2017 | Zhao et al. |
| 2018/0027603 A1 | 1/2018 | Lee |
| 2018/0077566 A1 | 3/2018 | Cha et al. |
| 2018/0255451 A1 | 9/2018 | Fan et al. |
| 2019/0075453 A1* | 3/2019 | Yoon .................. H04W 8/245 |
| 2019/0289059 A1 | 9/2019 | Vanahalli et al. |
| 2020/0059778 A1* | 2/2020 | Li .................. H04W 12/40 |
| 2021/0258794 A1 | 8/2021 | Jin et al. |

\* cited by examiner

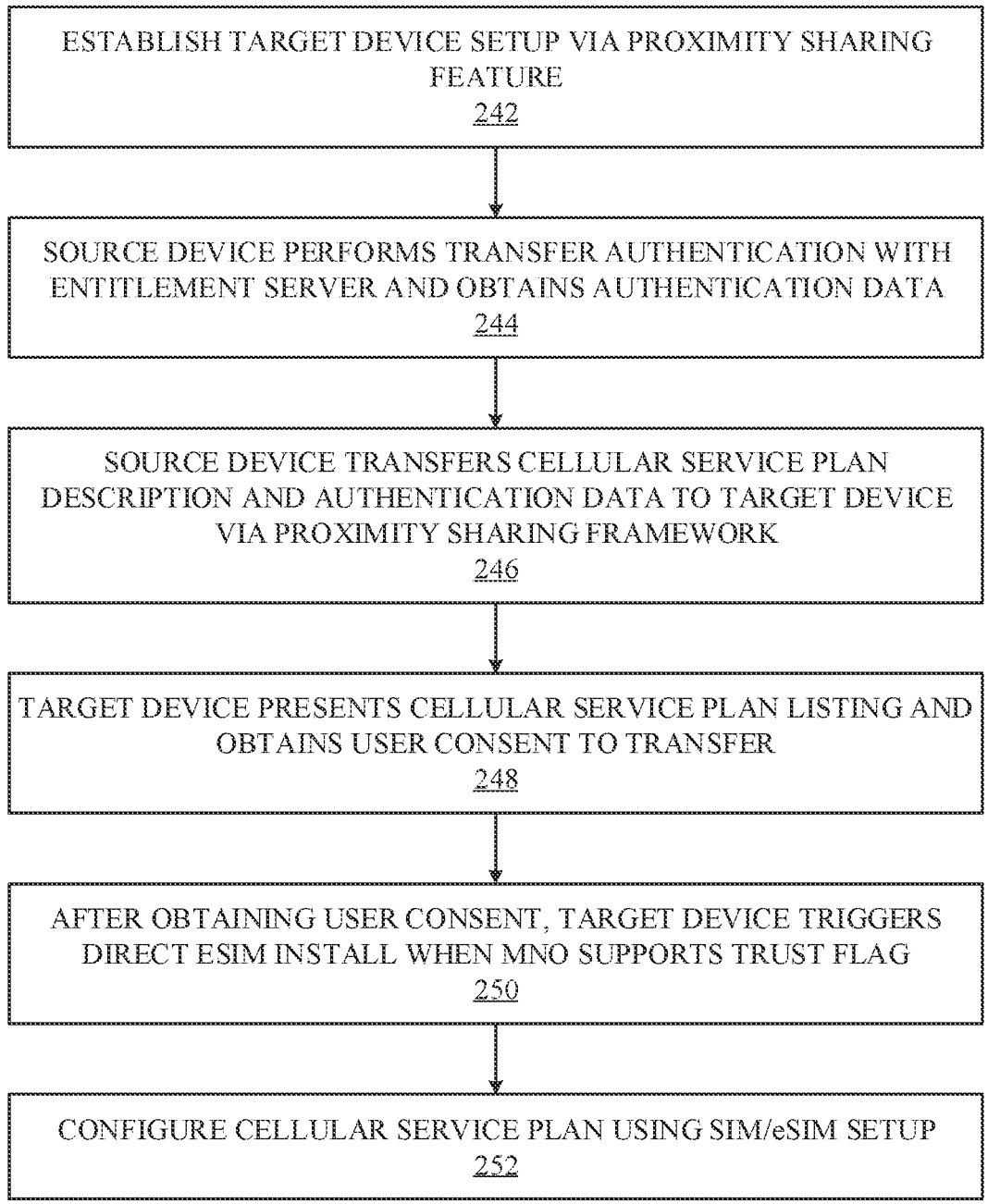

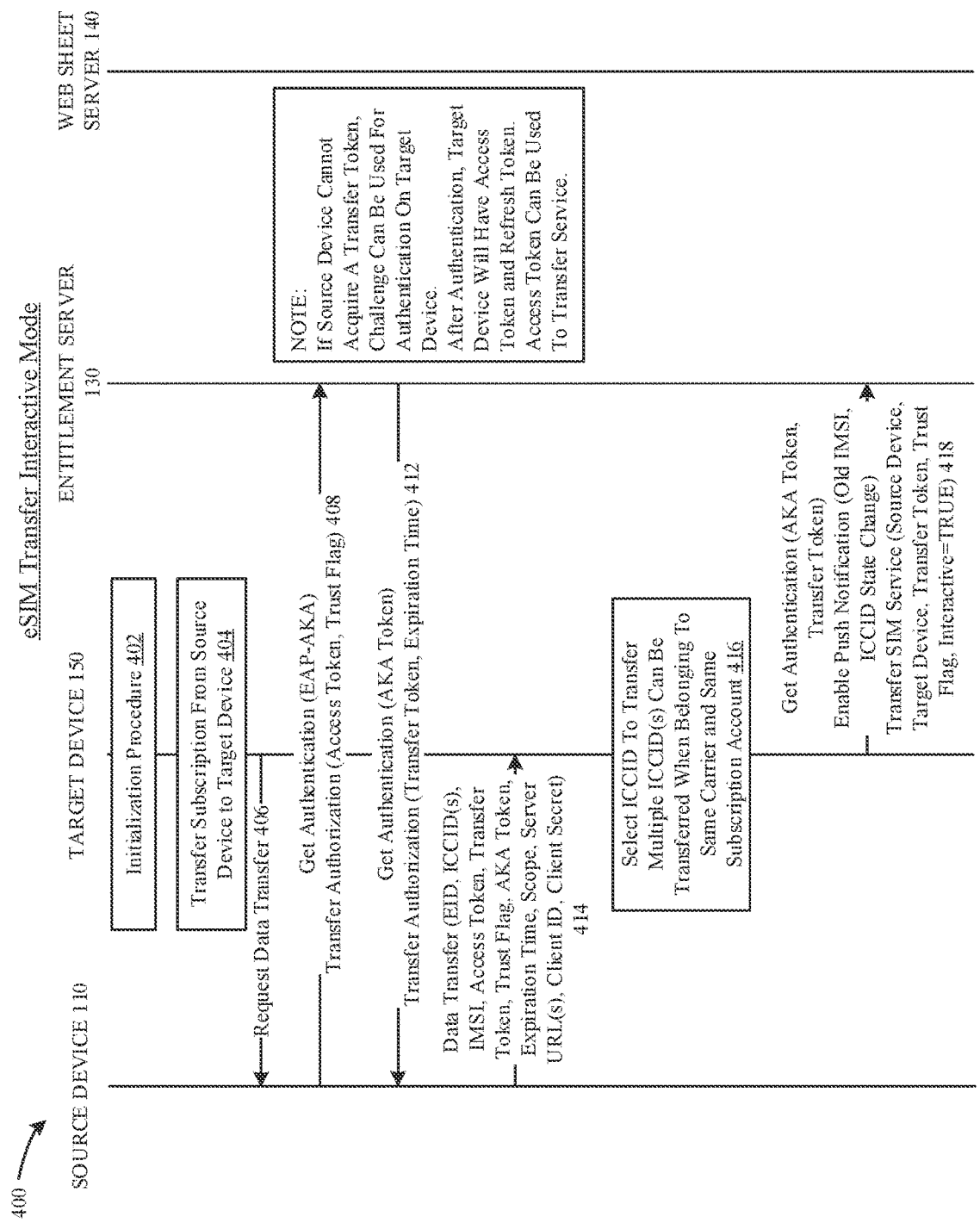

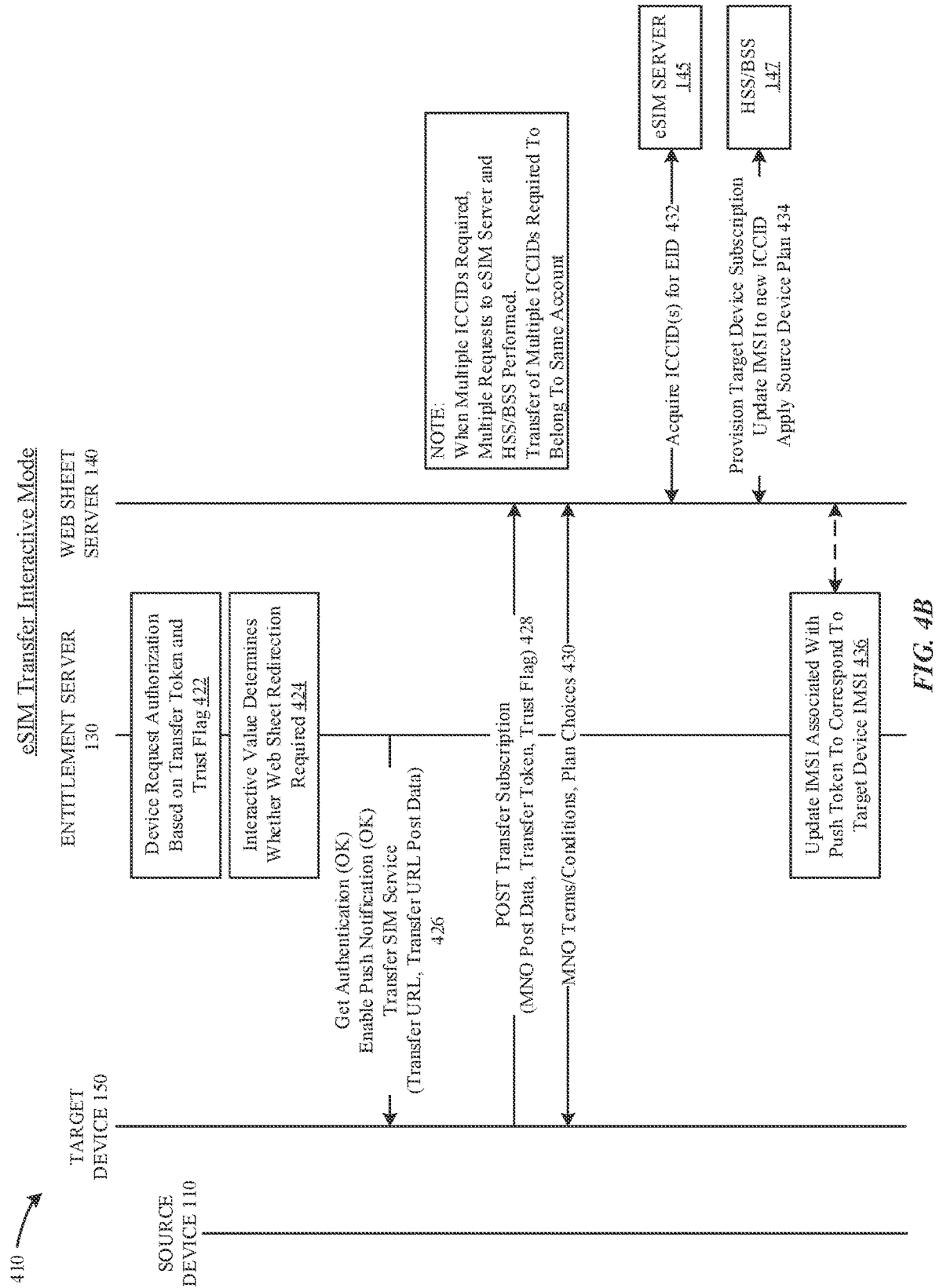

CELLULAR SERVICE ACCOUNT TRANSFER AND AUTHENTICATION

CROSS-REFERENCE TO RELATED APPLICATIONS

The present application is a continuation of U.S. application Ser. No. 17/176,167, entitled "CELLULAR SERVICE ACCOUNT TRANSFER AND AUTHENTICATION," filed Feb. 15, 2021, set to issue Oct. 25, 2022 as U.S. Pat. No. 11,483,711, which is a continuation of U.S. application Ser. No. 16/667,617, entitled "CELLULAR SERVICE ACCOUNT TRANSFER AND AUTHENTICATION," filed Oct. 29, 2019, issued on Feb. 16, 2021 as U.S. Pat. No. 10,924,921, which claims the benefit of U.S. Provisional Application No. 62/752,298, entitled "CELLULAR SERVICE ACCOUNT TRANSFER AND AUTHENTICATION," filed Oct. 29, 2018, the contents of all of which are incorporated by reference herein in their entirety for all purposes.

FIELD

The described embodiments relate to wireless communications, including methods and apparatus to support transfer of cellular service account credentials for cellular wireless services, such as cellular voice and data services authorized by subscriber identity modules (SIMs) and/or electronic SIM (eSIMs), between wireless devices.

BACKGROUND

Newer generation, e.g., fourth generation (4G) and fifth generation (5G), cellular wireless networks employing newer radio access technology that implements one or more $3^{rd}$ Generation Partnership Project (3GPP) Long Term Evolution (LTE), LTE Advanced (LTE-A), and 5G standards are rapidly being developed and deployed by network operators worldwide. The newer cellular wireless networks provide a range of packet-based services for both voice and data in parallel. A user of a wireless device can access services offered by a wireless network service provider, also referred to as a mobile network operator (MNO), based on service subscriptions controlled by authentication credentials included in a profile, also referred to as a subscriber identity module (SIM), when included in a removable universal integrated circuit card (UICC), also referred to as a SIM card, or as an electronic SIM (eSIM), when included in an embedded UICC (eUICC) of the wireless device. With a removable UICC and an unlocked wireless device, a user can access different services by replacing the UICC/SIM combination. With a configurable eUICC, eSIMs can be downloaded to the eUICC for access to different wireless services. Wireless devices that accommodate multiple UICCs/SIMs and/or multiple eSIMs on an eUICC provide for multiple subscriber identities to be used by the same wireless device to access different services, including services that can span different cellular wireless networks that use different cellular radio access technologies (RATs). A user can transfer cellular service accounts associated with one or more SIMs/eSIMs between wireless devices, such as when changing between different wireless devices or when purchasing and configuring a new wireless device to replace an older wireless device. There exists a need for mechanisms to allow a user to transfer cellular service account credentials associated with SIMs/eSIMs between wireless devices.

SUMMARY

This Application describes various embodiments that relate to wireless communications, including methods and apparatus to support transfer of cellular service credentials for cellular wireless services, such as cellular voice and data services authorized by subscriber identity modules (SIMs) and/or electronic SIM (eSIMs), between wireless devices. Transfer of cellular service credentials can occur between two devices that are within proximity of each other, e.g., where the devices can connect securely via a local connection, such as via a wireless personal area network (WPAN) connection, via a wireless local area network (WLAN) connection, via a peer-to-peer connection, or the like. Transfer of cellular service credentials can also occur via an online network-based service, such as via an iCloud® service, where the devices need not be in proximity to each other. Cellular service account transfer and authentication procedures can be based at least in part on proving authorization to transfer using a transfer token and a trust flag provided directly, e.g., via a peer-to-peer WPAN or WLAN connection when two devices are within proximity to each other, or indirectly, e.g., via a common shared network-based cloud service account, when the two devices are not connected to each other directly. In some embodiments, when a source device that seeks to transfer a cellular service credential to a target device cannot obtain a transfer token, the target device can authenticate with a network server, e.g., an entitlement server, separately using a challenge and response procedure. When successfully authenticated, the target device can use one or more tokens to transfer cellular service credentials. In some embodiments, a trust flag provides an indication of a trust relationship between a source device and a cellular service credential to be transferred, and shared secret data, such as a secret key, can be used to validate (or re-validate) a trust relationship. In some embodiments, transfer of cellular service credentials from a source device occurs as part of a setup process for a target device. In some embodiments, the source device provides cellular service plan description and authentication data to the target device to use for presenting options via a user interface of the target device for selection of which (if any) cellular service plan credentials to transfer to the target device. In some embodiments, a trust flag relationship established for a SIM/eSIM transferred to the target device can also be transferred to the target device. In some embodiments, an MNO can require interaction with a network-based service, e.g., a web-sheet server, to allow for transfer of one or more cellular service credentials to the target device.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

FIG. 2E illustrates a flow chart of an exemplary method for a one-click mode transfer of cellular service account credentials from a source device to a target device, according to some embodiments.

FIGS. 4A through 4C illustrate diagrams of an exemplary flow to transfer cellular service account credentials from a source device to a target device using an interactive mode, according to some embodiments.

DETAILED DESCRIPTION

Figure 1:
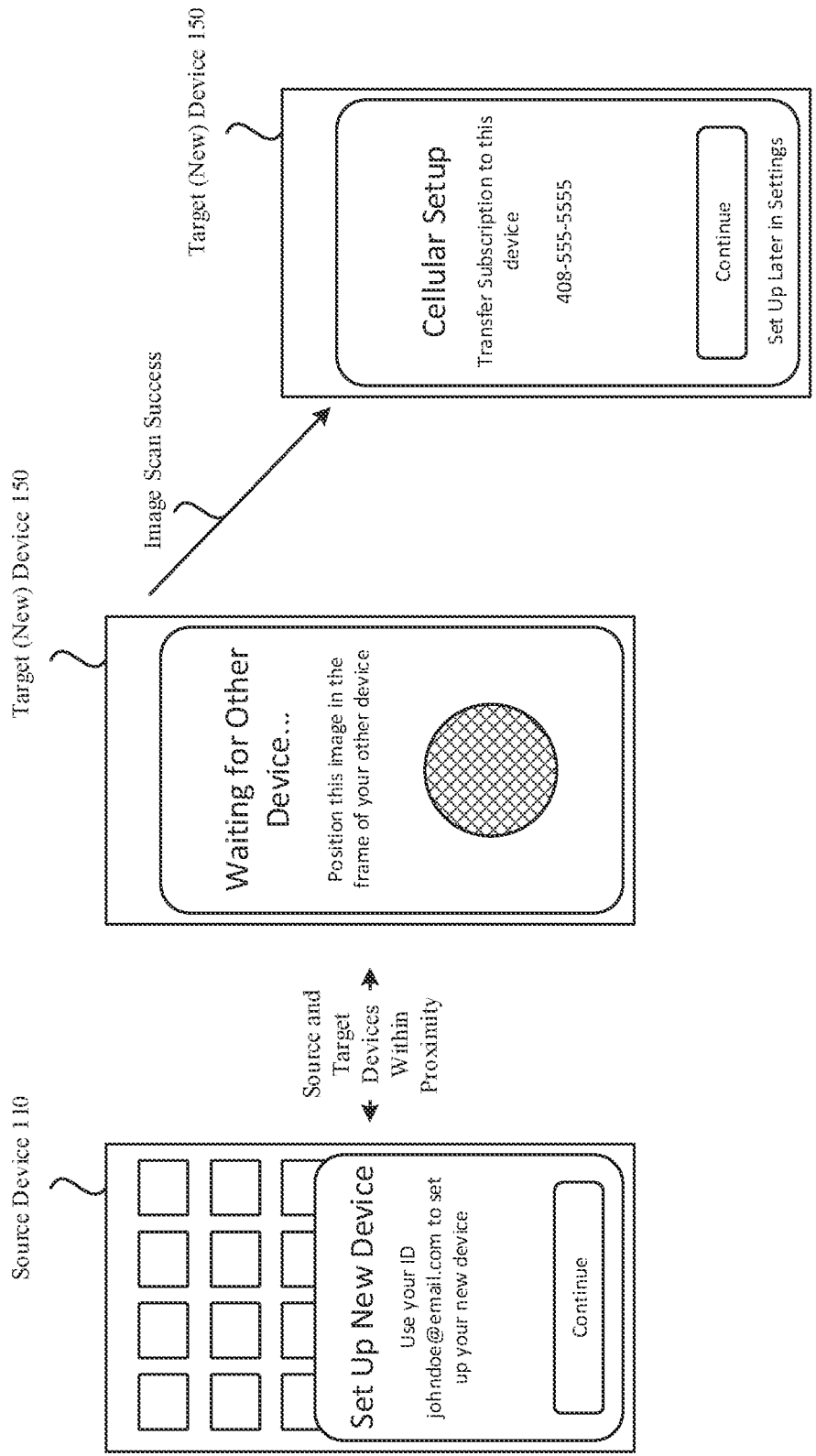
FIG. 1 illustrates a diagram of an exemplary transfer of cellular service account credentials for access to cellular services from a source device to a target device, according to some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Cellular wireless capability continues to be incorporated into a broad array of electronic devices, including mobile phones, tablets, portable computers, wearable devices, automobiles, etc. Additionally, credentials for access to cellular wireless services are evolving from removable secure cards, also referred to as subscriber identity module (SIM) cards, to include electronic SIMs (eSIMs) that can be installed and updated dynamically on secure system boards, such as embedded Universal Integrated Circuit Cards (eUICCs). A user can own and use multiple different electronic devices that each have cellular wireless service capabilities and can seek to re-use cellular service features and/or settings across multiple cellular-capable electronic devices. For example, when acquiring a new cellular-capable electronic device, a user can seek to transfer cellular credentials from an existing device to the new device in as flexible and efficient a manner as possible. As such, this Application describes cellular service account transfer and authentication procedures that can be used to move credentials and update cellular mobile network operator (MNO) servers appropriately.

A user can seek to transfer credentials from a first device, which can be referred to as a source device, to a second device, which can be referred to as a target device. The user can be associated with a common user account, e.g., an Apple ID maintained by a network-based cloud service, e.g., iCloud, and can register each of the source device and the target device with the same user account. The user can seek to transfer credentials from a physical SIM card, e.g., a 4FF card, of the source device to an eUICC of the target device. Alternatively, and/or additionally, the user can seek to transfer credentials in the form of an eSIM included in an eUICC of a source device to an eUICC of a target device. Devices that include an eUICC can usually support multiple eSIMs, and in some instances, the user can seek to transfer a set of eSIMs from a source device to a target device. Some devices can also include both one or more removable SIM cards and one or more eSIMs on an eUICC of the device, and the user can seek to transfer credentials from the SIM card(s) and/or eSIMs from the eUICC of the device to another device.

Transfer of credentials can occur between two devices that are within proximity of each other, e.g., where the devices can connect securely via a local connection, such as via a wireless personal area network (WPAN) connection, via a wireless local area network (WLAN) connection, via a peer-to-peer connection, or the like. Transfer of credentials can also occur via a network-based cloud service, such as via an iCloud service, where the devices need not be in proximity to each other. In either case, transfer of credentials can include communication between the source device, the target device, and/or one more network-based servers, which can include mobile network operator (MNO) managed servers, such as an entitlement server, a web-sheet server, an authentication server, a provisioning server, a subscription management data preparation (SM-DP+) server, a home subscriber server (HSS), and/or an authentication server, as well as third-party managed servers, such as a cloud server and/or an identification services server.

These and other embodiments are discussed below with reference to FIGS. 1 through 8; however, those skilled in the art will readily appreciate that the detailed description given herein with respect to these figures is for explanatory purposes only and should not be construed as limiting.

FIG. 1 illustrates a diagram 100 of an exemplary transfer of credentials from a source device 110 to a target device 150 when the source device 110 and the target device 150 are within proximity of each other and able to establish a secure connection between the target device 150 and the source device 110. In some embodiments, the source device 110 and the target device 150 can present, via respective user interfaces, information to assist a user in transferring credentials from the source device 110 to the target device 150. An encoded image, such as a quick response (QR) code and/or a dynamic version thereof, can be provided on the target device 150 for verifying the target device 150 by the source device 110. When verification via an image scan performed by the source device 110 (or another verification mechanism) succeeds, a "one-click" cellular service transfer option procedure can be provided for the user to transfer one or more credentials associated with a particular mobile device phone number (and/or with a particular cellular service account) from the source device 110 to the target device 150. In some embodiments, multiple credentials associated with a single cellular service account can be transferred from the source device 110 to the target device 150. In some embodiments, one or more credentials associated with a particular international mobile subscriber identity (IMSI) can be transferred from the source device 110 to the target device 150. In some embodiments, a list of cellular service accounts, plans, and/or phone numbers can be presented from which a user can select one or more to transfer from the source device 110 to the target device 150.

Figure 2A:
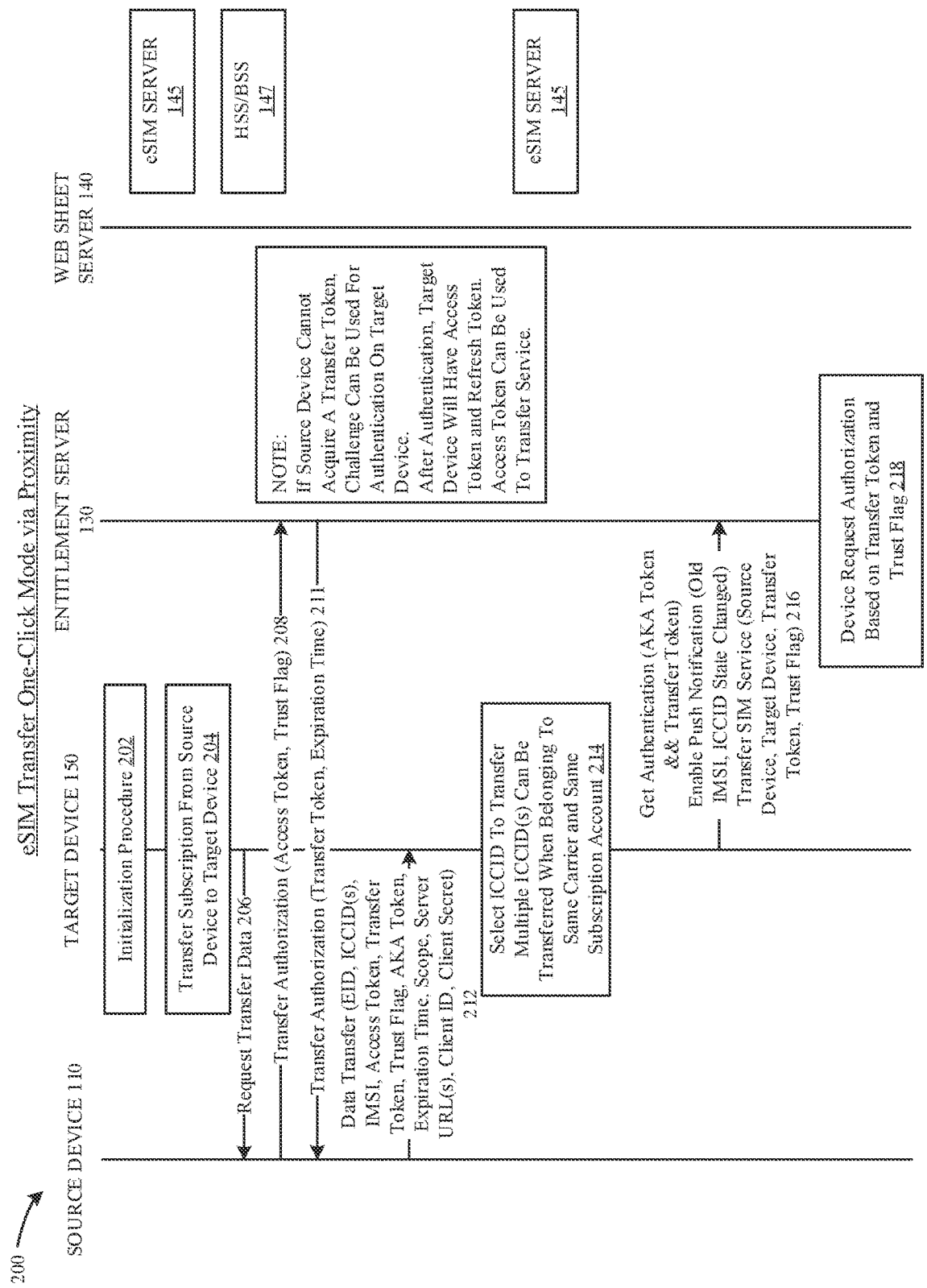
FIGS. 2A through 2C illustrate diagrams of an exemplary flow to realize a one-click mode transfer of cellular service account credentials between a source device and a target device within proximity of each other, according to some embodiments.
Figure 2B:
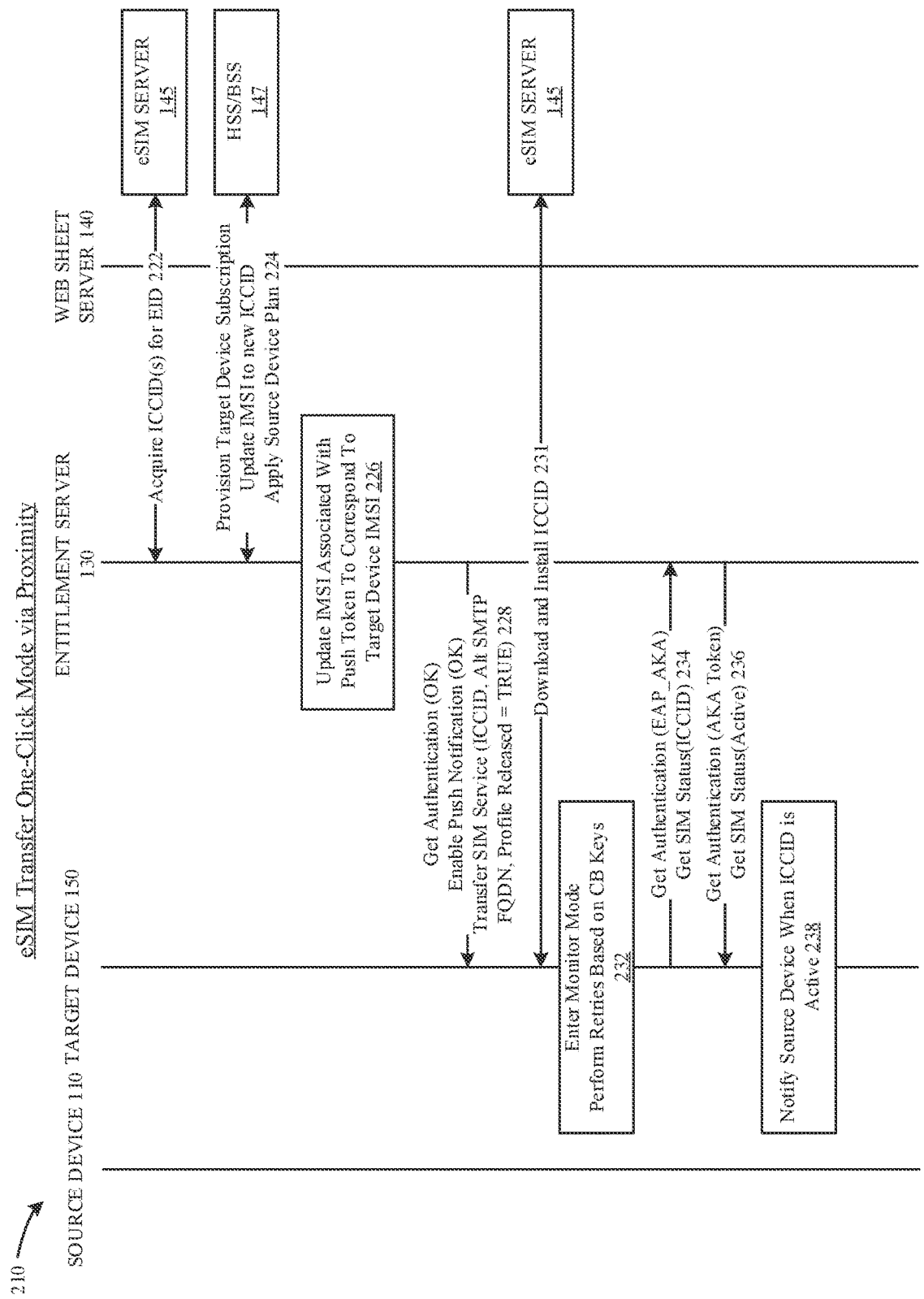
Figure 2C:
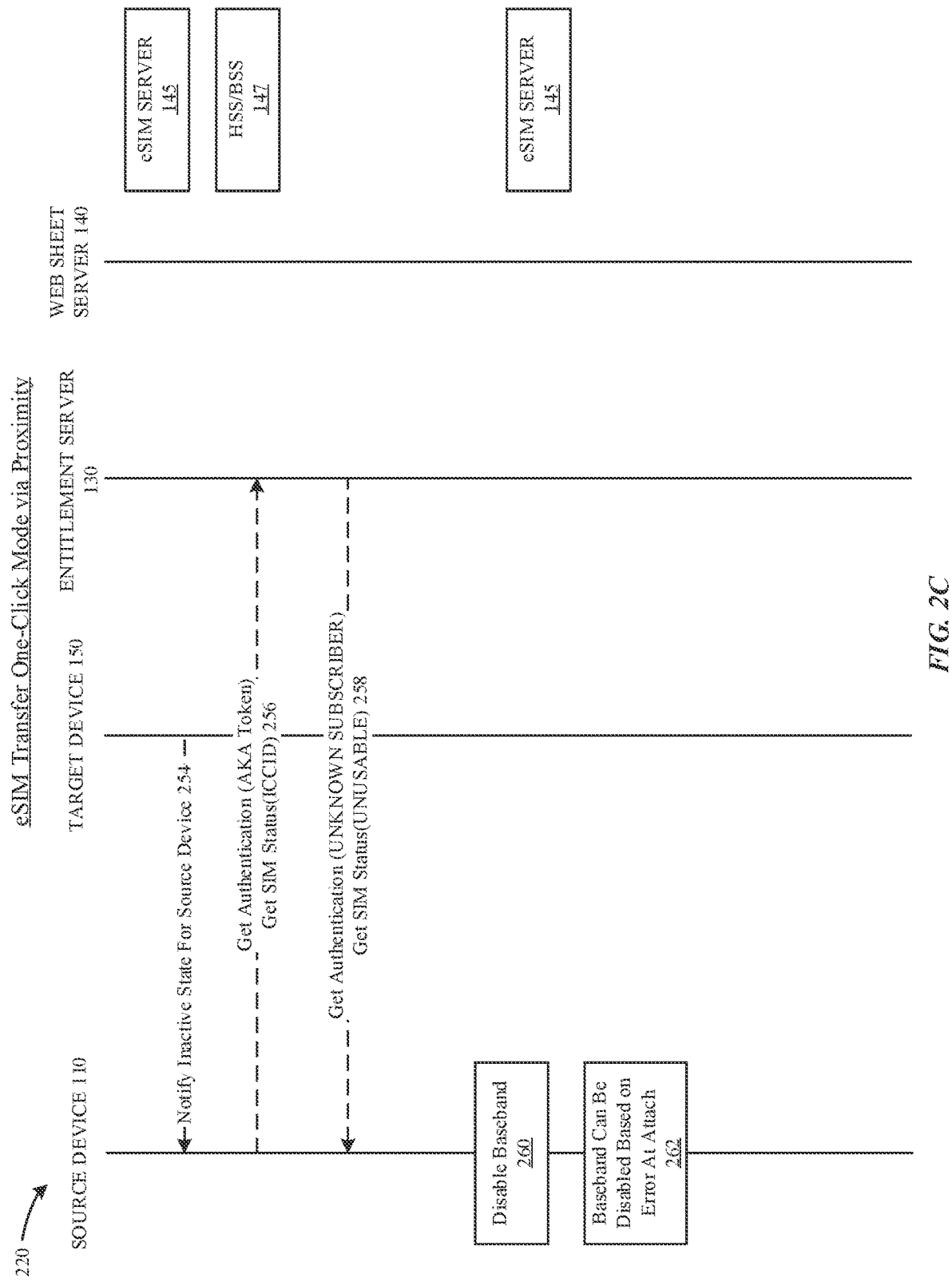

FIGS. 2A, 2B, and 2C illustrate diagrams 200, 210, 220 of an exemplary flow to realize a one-click mode transfer of credentials between a source device 110 and a target device 150 when the source device 110 and the target device 150 are within proximity of each other. Transfer of credentials can occur in conjunction with an initialization procedure 202 for the target device 150, in some embodiments, or as a separate process after initialization of the target device 150 has completed. The one-click operation illustrated in FIGS. 2A, 2B, and 2C allows for bypassing interaction with a web sheet server 140 maintained by an associated MNO to simplify the transfer process, as the user need not recall infrequently used (and therefore easily forgotten) login credentials required by the MNO for account service management. Instead, an MNO server, e.g., an entitlement server 130, can authorize transfer when the source device 110 provides a valid trust flag and an access token, to which in response the MNO provides a transfer token that has a limited validity time period. At 204, an option to transfer one or more cellular service subscriptions from the source device 110 to the target device 150 can be presented to the user for selection and/or approval. The target device 150, at 206, can send a request to the source device 110 to transfer one or more cellular service subscriptions. The source device 110 can send a transfer authorization request, at 208, to an entitlement server 130 providing a valid access token (which the source device 110 can have previously obtained) and a trust flag (which can provide an indication of a relationship between the source device 110 and a cellular service account to be transferred). The source device 110 can obtain from the entitlement server 130, at 211, a transfer token with an indication of a limited time expiration for the transfer token to be used for transfer of the associated cellular service account(s). The source device can provide the transfer token and expiration time, along with additional data, at 212, to the target device 150 for use in requesting transfer of cellular services from the source device 110 to the target device 150. Exemplary data can include a hardware identifier of the source device 110, e.g., an universal integrated circuit card (eUICC) identifier (EID), a set of tokens including the access token, the transfer token, an authorization key agreement (AKA) token, an MNO server address, e.g., a universal resource locator (URL) or fully qualified domain name (FQDN) for a provisioning server from which to obtain appropriate credentials for the target device 150. The source device 110 can transfer the data to the target device 150 securely (e.g., encrypted and via a secure connection) along with one or more tokens that can be used by the target device 150 to validate with one or more MNO servers. In some embodiments, the source device 110 communicates with multiple MNO entitlement servers 130 associated with respective MNOs to obtain transfer tokens to transfer one or more cellular service subscriptions for different MNOs to the target device 150. The source device 110 can provide sufficient information gathered from MNO servers to the target device 150 to use to connect with (authenticate), identify the cellular service subscriptions to transfer, and indicate authorization to transfer the cellular service subscriptions to the target device 150. In some embodiments, credentials to be transferred can be associated with unique identifiers, e.g., integrated circuit card identifiers (ICCIDs), and a user can seek to transfer cellular service for one or more of multiple ICCIDs from the source device 110 to the target device 150, where the multiple ICCIDs are associated with a common MNO and a common user cellular service subscription account. In some embodiments, at 214, a user can select one or more ICCIDs associated with a common user cellular service subscription account for which cellular service is requested to transfer to the target device 150, e.g., via an interface of the target device 150. (For different MNOs, the procedure can be repeated separately to allow transfer of cellular service for one or more ICCIDs from multiple MNOs as well; however, each distinct MNO can require its own unique set of tokens). In some embodiments, when the source device 110 is unable to obtain a transfer token from the entitlement server 130, a challenge and response message exchange can be used to authenticate the target device 150 with the entitlement server 130. At 216, the target device 150 authenticates with the entitlement server 130 using the AKA token and the transfer token obtained from the source device 110. At 216, the target device 150 also requests push notification to be enabled using a phone number from the source device 110, e.g., an "old IMSI" value, and an indication that an ICCID's state will be changed. At 216, the target device 150 further submits a request to the entitlement server 130 to transfer cellular service for one or more SIMs/eSIMs from the source device 110 to the target device 150. The target device 150 can provide to the entitlement server 130 the trust flag obtained by the source device 110 previously from the entitlement server 130. At 218, the entitlement server 130 recognizes the target device 150 requests authorization to transfer service based on the provided transfer token and trust flag. When the target device 150 authenticates successfully with the entitlement server 130, such as based on providing a valid transfer token and a valid trust flag, the entitlement server 130, at 222, interfaces with an eSIM (provisioning) server 145 to obtain new ICCIDs to use for cellular service for the target device 150. The entitlement server 130, at 224, also interfaces with MNO back-end servers, e.g., a home subscriber server (HSS), an operations support system (OSS), business support system (BSS), or the like, abbreviated as HSS/BSS 147, to provision the target device 150 to an existing subscription plan, updating the international mobile subscriber identity (IMSI) to correspond to a new ICCID value (for an eSIM to be installed in the target device 150) and associating the target device 150 with the subscription plan previously used by the source device 110. At 226, the entitlement server 130 updates an IMSI value associated with a push token to correspond to the IMSI of the target device 150. At 228, the entitlement server 130 provides to the target device an indication that authentication is successful, push notification has been enabled, and that cellular service for a SIM/eSIM can be transferred to the target device 150. The entitlement server 130, at 228, can provide a network address, e.g., a URL or a fully qualified domain name (FQDN) for a provisioning (eSIM) server 145 from which the target device 150 can download the credentials for access to the cellular service of the MNO. The target device 150, at 231, subsequently obtains a valid eSIM associated with the new ICCID and installs the valid eSIM on its eUICC. At 232, the target device 150 can enter a scan (monitor) mode to scan for an access network of the cellular wireless network with which the installed valid eSIM is associated. The target device 150 can use information contained in a previously installed carrier bundle to determine radio frequencies and other relevant parameters to perform the scan search for the access network. At 234, the target device 150 can perform an Extensible Authentication Protocol Authentication Key Agreement (EAP-AKA) procedure with the entitlement server 130 and request from the entitlement server 130 status for the eSIM associated with the new ICCID. At 236, the target device 150 obtain an AKA token from the entitlement server 130 and an indication that the eSIM is active. Following authentication with the entitlement server 130, the target device 150 can be activated for using cellular service via the MNO's network using credentials associated with the new ICCID. In some embodiments, the target device 150, at 238, can notify the source device 110 that the new ICCID has been activated, indicating that cellular service has been transferred to the target device 150. In some embodiments, the target device 150, at 254, notifies the source device 110 that the old ICCID, previously used for cellular service access by the source device 110, is now inactive. At 256, the source device 110 can send an authentication message to the entitlement server 130 using a previously used AKA token and can also send a message requesting status for the eSIM associated with the old ICCID value. As the eSIM is no longer usable for the source device 110, having been transferred to the target device 150, the entitlement server 130 is unable to authenticate the source device with the provided AKA token and returns, at 258, an authentication message with an error indication of an unknown subscriber as well as an unusable status indication for the eSIM. In some embodiments, the source device 110 can subsequently be deactivated with the MNO, e.g., when no remaining valid eSIMs or SIM cards are installed and/or activated on the source device 110. In some embodiments, at 260, the source device can disable baseband wireless circuitry when no valid eSIMs/SIMs are installed or activated for the source device 110 following the transfer procedure. In some embodiments, at 262, baseband wireless circuitry of the source device 110 can be disabled based on an error that occurs when attempting to attach to the access network of the cellular wireless network of the MNO for which transfer of credentials has completed successfully to the target device 150. The credential transfer illustrated in FIGS. 2A, 2B, and 2C can allow for moving a subscription from the source device 110 to the target device 150 without making any changes to the subscription. The transfer can be used by a user of the two devices, source device 110 and target device 150, to swap between them as desired with minimal interaction, thereby allowing for ICCID reassignment and/or re-use across multiple devices without the MNO invalidating ICCIDs. This efficient transfer mode provides for flexible use of multiple devices based on a familiar subscription plan. In some embodiments, ICCID values are reused. In some embodiments, cellular service for an old ICCID value used at a source device 110 is reassigned to a new ICCID value at the target device 150.

Figure 2D:
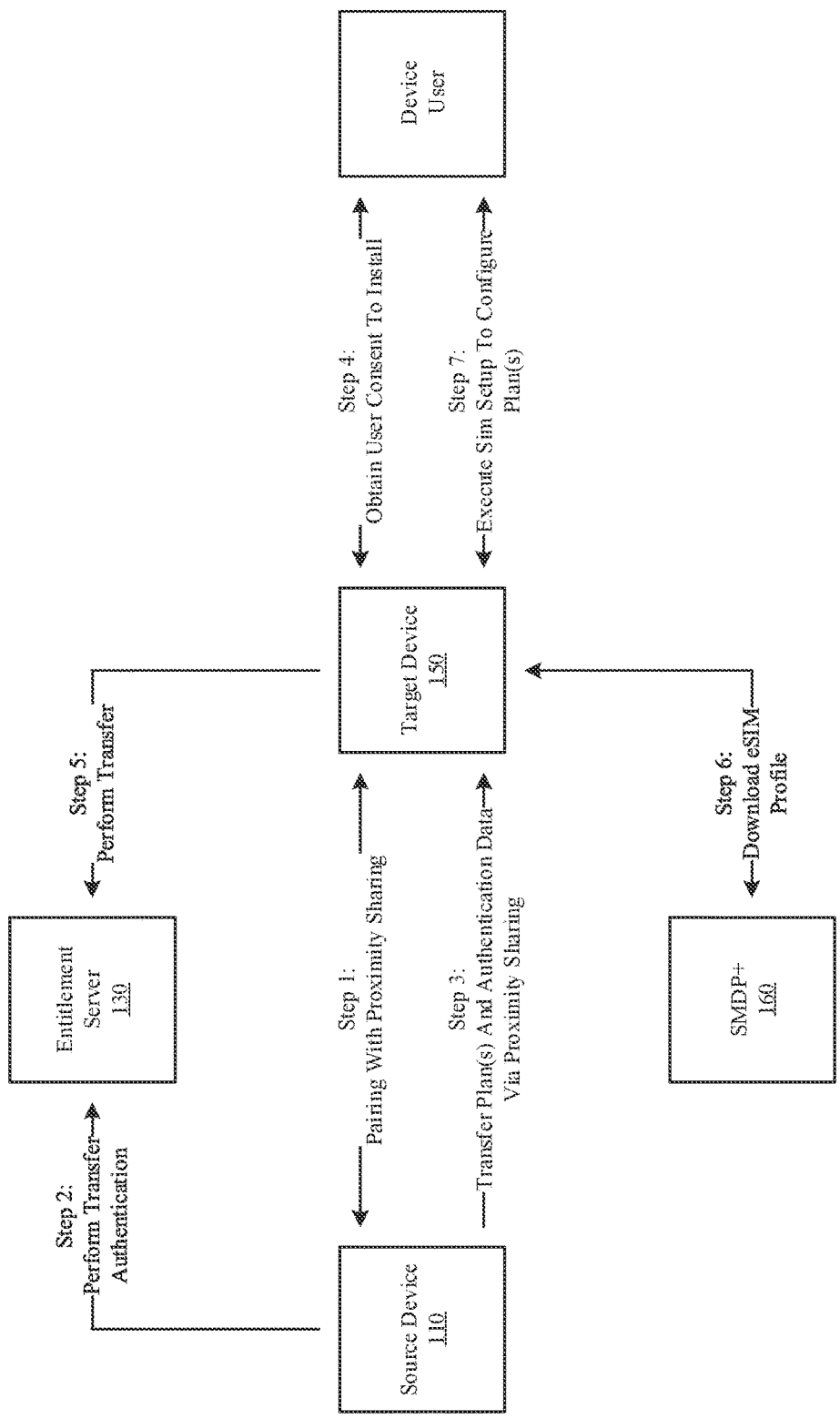
FIG. 2D illustrates another flow diagram for an exemplary one-click transfer of a cellular service account credential between two devices within proximity of each other, according to some embodiments.

FIG. 2D illustrates another flow diagram 230 for a one-click mode transfer of a cellular service credential, e.g., an eSIM, between two devices, e.g., the source device 110 and the target device 150, when the two devices are within proximity of each other. At step 1, the source device 110 and the target device 150 can pair with each other and establish a secure connection between themselves. At step 2, the source device 110 can perform a transfer authentication procedure with an MNO network server, e.g., the entitlement server 130. At step 3, the source device 110 can transfer subscription plan information and authentication data to the target device 150 via the secure connection established during proximity sharing of step 1. At step 4, the target device 150 can obtain user consent, e.g., via a user interface interaction, to install a cellular service plan and associated data to the target device 150. At step 5, the target device 150 can perform the transfer via communication with the entitlement server 130. At step 6, the target device 150 can obtain applicable eSIMs (also referred to in some embodiments as profiles) from an MNO provisioning server, e.g., a subscription management data preparation platform, also referred to as an SMDP+ server 160. In some embodiments, transfer of the credentials can be allowed by the MNO based on a trust flag provided by the target device 150 to the MNO server. In some embodiments, the subscription plan associated with the transferred credentials (eSIMs) can be configured by a user of the target device 150.

FIG. 2E illustrates an exemplary flow chart 240 of a method for a one-click mode transfer of cellular service credentials from a source device 110 to a target device 150. At 242, the target device 150 and the source device 110 establish a secure connection via a proximity sharing feature. At 244, the source device 110 performs a transfer authentication procedure with the entitlement server 130 and obtains authentication data to use for transfer of the cellular service credentials to the target device 150. At 246, the source device 110 transfers cellular service plan description and authentication data to the target device 150 via the secure connection established via proximity sharing. At 248, the target device 150 presents a cellular service plan listing via a user interface and obtains user consent to effect the transfer cellular service to the target device 150. At 250, after obtaining user consent, the target device 150 triggers direct cellular service credential (eSIM) installation to the target device 150, when an MNO associated with the to be installed eSIM supports authentication/authorization via a trust flag provided by the target device 150. At 252, the cellular service plan can be optionally configured using a SIM/eSIM setup procedure via the target device 150.

Figure 3A:
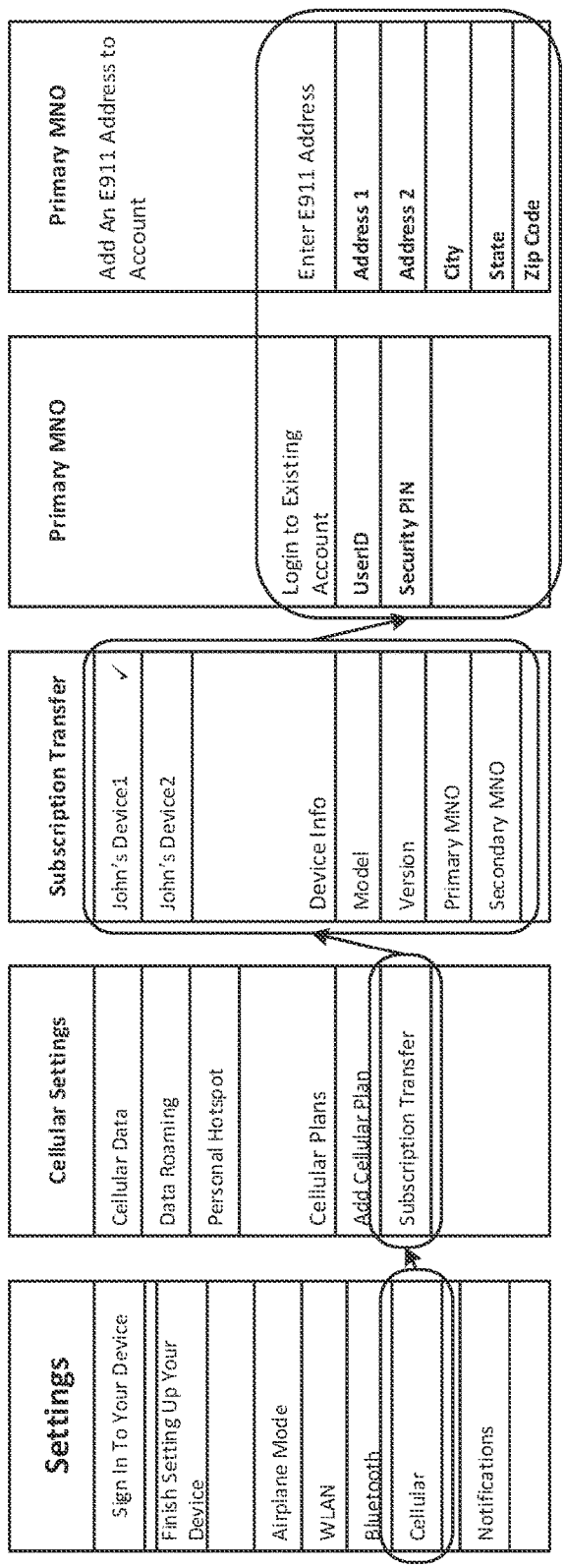
FIG. 3A illustrates a diagram of an exemplary series of user interface displays for a transfer of cellular service account credentials for a cellular service plan between two devices, according to some embodiments.

FIG. 3A illustrates a diagram 300 of an exemplary series of user interface displays for a transfer of cellular service account credentials for a cellular service plan between two devices using a network-based cloud service account with additional interaction with an MNO web-sheet server. A user can access an option for transferring credentials via a settings menu and indicate a device from which to transfer cellular service plan credentials. In some embodiments, a set of one or more devices associated with a common user account, e.g., an Apple iCloud account, can be presented from which a user can select a device to transfer one more cellular service plan credentials. In some embodiments, the cellular service plan credential transfer indicated in FIG. 3A, can be performed after initialization of a target device to which the credential(s) will transfer has occurred. In some embodiments, both a source device (from which the credentials will transfer) and the target device can be both logged into a common user account, e.g., the Apple iCloud account, using a common user identify, e.g., an identical Apple identifier (ID), and the source device and the transfer device need not be within proximity of each other. In some embodiments, the target device can discover a set of one or more associated source devices from which cellular service credentials may be eligible for transfer to the target device. In some embodiments, the target device authorizes transfer of cellular service credentials via communication with a web-sheet server of an associated MNO, e.g., by entering MNO user account credentials to the web-sheet server for an existing cellular service user subscription account. Authentication via the web-sheet server can be used with an MNO instead of a transfer token as described for FIGS. 2A to 2E.

Figure 3B:
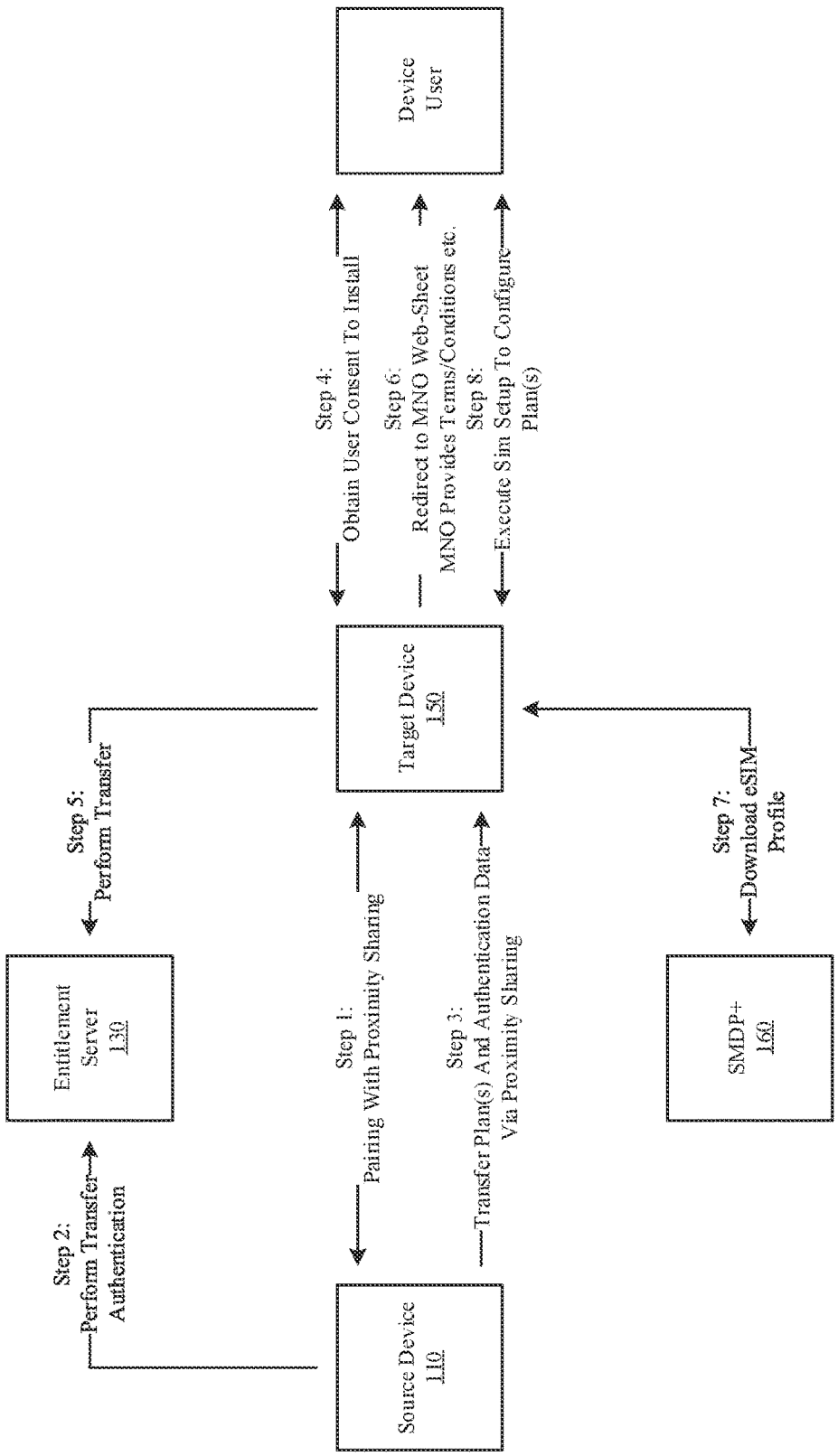
FIG. 3B illustrates a flow diagram for an exemplary network-based cloud service account transfer of cellular service account credentials between a source device and a target device, according to some embodiments.

FIG. 3B illustrates a flow diagram 310 for an exemplary network-based cloud service account transfer of credentials by interacting with an MNO web-sheet server. At step 1, the source device 110 and the target device 150 can pair with each other via a proximity sharing feature and establish a secure connection between themselves. At step 2, the source device 110 can perform a transfer authentication procedure with the entitlement server 130. At step 3, the source device 110 can transfer subscription plan information and authentication data to the target device 150 via the secure connection established via the proximity sharing feature of step 1. At step 4, the target device 150 can obtain consent, e.g., via a user interface interaction, to install a cellular service plan and associated data to the target device 150. At step 5, the target device 150 can perform the transfer via communication with the entitlement server 130. At step 6, the target device 150 can be redirected to an MNO web-sheet server and require additional authentication credentials, e.g., a login/password/security PIN, etc., for a cellular service user subscription account, and upon successful verification, the MNO web sheet server can provide additional information, such as terms and conditions for subscription to the cellular service plan, etc. to the target device 150. At step 7, the target device 150 can obtain applicable eSIMs (also referred to in some embodiments as profiles) from an MNO SMDP+ server 160. At step 8, in some embodiments, the subscription plan associated with the transferred credentials (eSIMs) can be configured by a user of the target device 150. The flow illustrated in FIG. 3B can be used when the MNO does not support use of a trust flag and requires separate authentication of the user to permit management of cellular services associated with a cellular service account.

Figure 3C:
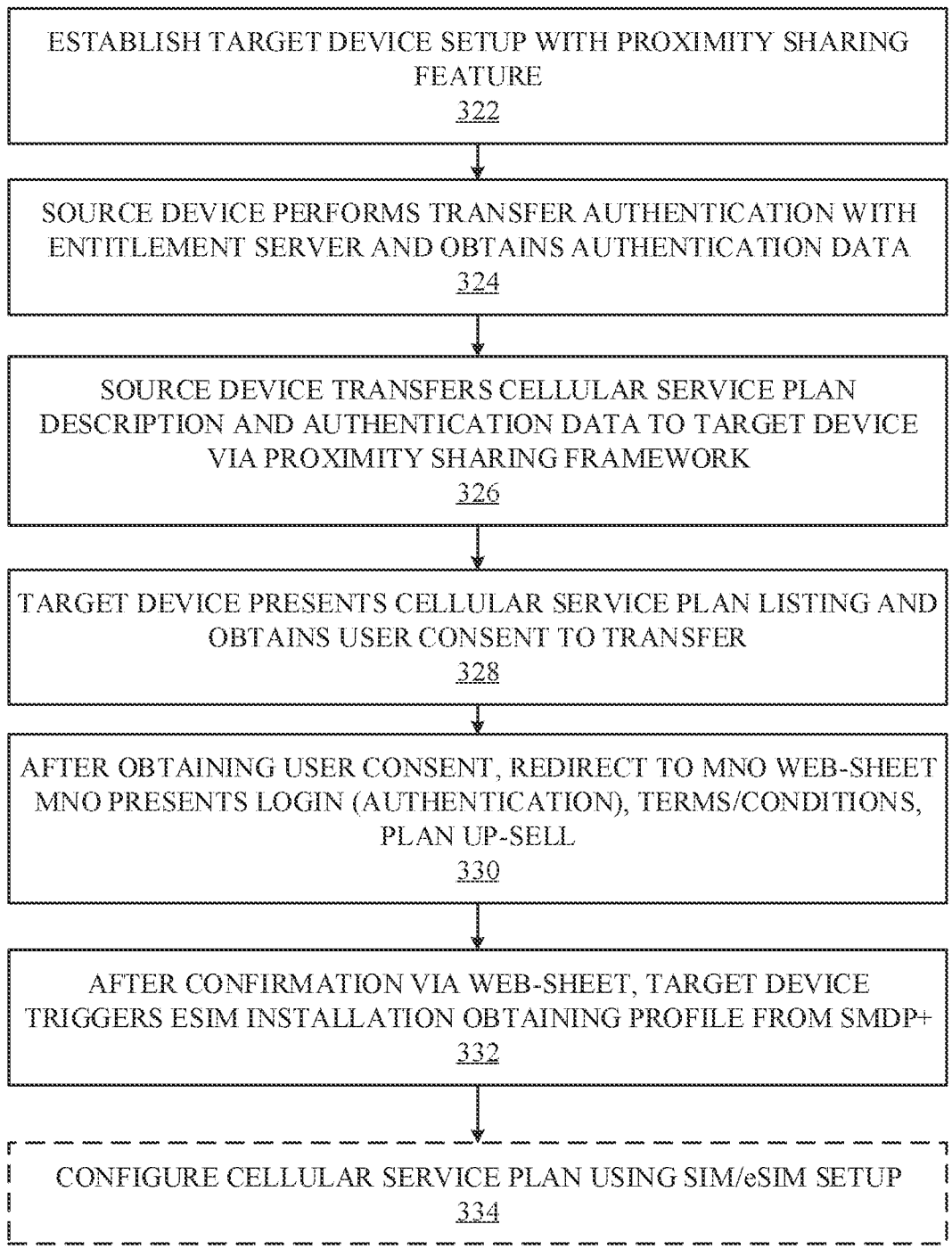
FIG. 3C illustrates a flow chart of an exemplary method for a network-based cloud service account transfer of cellular service credentials between two devices, according to some embodiments.

FIG. 3C illustrates a flow chart 320 of an exemplary method for a network-based cloud service account transfer of cellular service credentials including interaction with an MNO web-sheet server. At 322, the target device 150 and the source device 110 establish a secure connection, e.g., via a proximity sharing feature. At 324, the source device 110 performs a transfer authentication procedure with an MNO server, e.g., an entitlement server 130, and obtains authentication data from the entitlement server 130 to provide to the target device 150. At 326, the source device 110 transfers cellular service plan description and authentication data to the target device 150 via the secure connection established via the proximity sharing feature. At 328, the target device 150 presents a cellular server plan listing via a user interface of the target device 150 and obtains user consent to effect the transfer of one or more cellular service credentials. At 330, after obtaining user consent, the target device 150 redirects to an MNO web-sheet server, which requires that the target device 150 successfully complete authentication (login), and subsequently presents terms and conditions for cellular service plans, and optionally provides additional (up-sell) cellular service plan information. At 332, after confirmation via the MNO web-sheet server, the target device 150 triggers credential/profile (eSIM) installation from a provisioning server, e.g., an SMDP+ server 160 of the MNO. At 334, the cellular service plan can be optionally configured using a SIM/eSIM setup procedure via an interface of the target device 150.

Figure 4C:
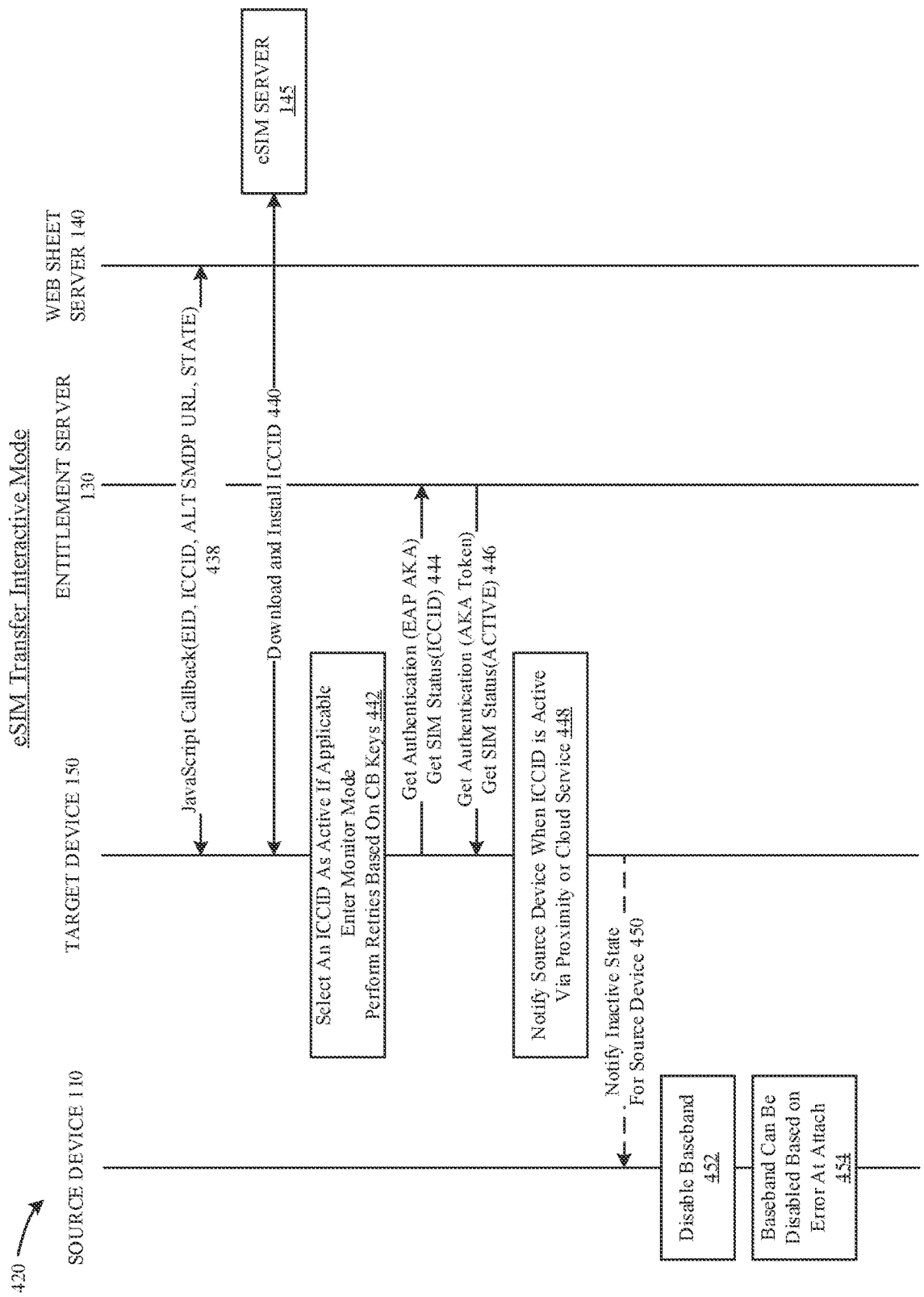

FIGS. 4A, 4B, and 4C illustrate diagrams 400, 410, 420, of an exemplary transfer of cellular service account credentials, e.g., eSIMs, between a source device 110 and a target device 150 using an interactive mode. An interactive value determines whether redirection to a web-sheet server is required to complete the transfer of the credentials. At 402, an initialization procedure to setup the target device 150 is performed. At 404, an option to transfer a cellular service subscription plan from an associated source device 110 to the target device 150 can be presented to a user via an input/output of the target device 150, and a user can provide an indication to cause a transfer to occur. At 406, the target device 150 sends a message to the source device 110 to request a transfer of one or more cellular service plans from the source device 110 to the target device 150. The source device 110 can be within proximity of the target device 150, and communication between the source device 110 and the target device 150 can be over a secure direct connection. In some embodiments, the source device 110 and the target device 150 can each be logged into a common user account, e.g., an Apple iCloud account, and can communicate via a network-based connection (instead of and/or in addition to a direct proximity connection). At 408, the source device 110 authenticates with an applicable MNO server, e.g., the entitlement server 130, using an EAP-AKA authentication procedure. In some embodiments, the source device 110 provides a previously obtained access token and trust flag (the latter may have been obtained from a third-party server or from an MNO server), where the trust flag provides an indication of an existing trust relationship between a user account and the source device 110. In some embodiments, the entitlement server 130 determines whether to grant a request for a change of service, e.g., to transfer service from the source device 110 to another device, such as the target device 150, based at least in part on the trust flag. At 412, the entitlement server 130 provides to the source device 110 an authentication and key agreement (AKA) token and a transfer token with an expiration time (indicating a time period or time expiration for the transfer token). In some embodiments, the source device 110 communicates with multiple MNO entitlement servers 130 associated with respective MNOs to obtain transfer tokens to transfer one or more cellular service subscriptions for different MNOs to the target device 150. The source device 110 can provide sufficient information gathered from MNO servers to the target device 150 to use to connect with (authenticate), identify the cellular service subscriptions to transfer, and indicate authorization to transfer the cellular service subscriptions to the target device 150. At 414, the source device 110 communicates data to the target device 150 to use for the cellular service transfer. The data can include unique identifiers of the source device 110, e.g., an EID value, one or more ICCIDs for one or more cellular service credentials, e.g., eSIMs, to transfer (or potentially transfer based on a subsequent user selection of which cellular service credentials to transfer), an access token, the transfer token (obtained previously from the entitlement server 130), the trust flag, the AKA token (also obtained previously from the entitlement server 130), an expiration time indication for the transfer token, network addresses for one or more MNO servers, e.g., URLs or FQDNs for provisioning servers from which to downloaded applicable cellular service credentials to the target device 150. At 416, a user can select one or more ICCIDs associated with cellular service plans to transfer to the target device 150 from the source device 110, such as via an interactive list presented on an I/O of the target device 150. In some embodiments, multiple ICCIDs can be selected when associated with the same MNO and same user cellular service subscription account. (For different MNOs, the procedure can be repeated separately to allow transfer of cellular service for one or more ICCIDs from multiple MNOs as well; however, each distinct MNO can require its own unique set of tokens). In some embodiments, when the source device 110 is unable to obtain a transfer token from the entitlement server 130, a challenge and response message exchange can be used to authenticate the target device 150 with the entitlement server 130. At 418, the target device 150 authenticates with the entitlement server 130 using the AKA token and the transfer token obtained from the source device 110. The target device 150 can also request push notifications to be enabled for the target device using an identifier from the source device 110, e.g., an IMSI value for the source device 110 and an indication of a state change for an ICCID to be transferred. The target device 150 can also submit a request to the entitlement server 130 to transfer cellular service for one or more SIMs/eSIMs from the source device 110 to the target device 150. The target device 150 can provide to the entitlement server 130 the trust flag obtained by the source device 110 previously from the entitlement server 130. In some embodiments, the target device 150 provides an interactive value that indicates that interaction with a web-sheet server may be required to authorize transfer of the cellular service credentials from the source device 110 to the target device 150. At 422, the entitlement server 130 recognizes the target device 150 requests authorization to transfer service based on the provided transfer token and trust flag. At 424, the entitlement server 130 determines whether interaction with a web-sheet server is required based on the interactive value included in the transfer SIM/eSIM service request provided at 418. When the interactive value indicates that web-sheet server interaction is required, further steps are performed to effect transfer of the SIMs/eSIMs. At 426, the entitlement server 130 indicates to the target device 150 that authentication was successful and push notification is enabled, and the target device 150 additionally provides network address for one or more network servers, e.g., the web-sheet server 140 and/or the eSIM server 145, along with additional data for the target device 150 to use for downloading and installing eSIMs. At 428, the target device 150 communicates with an MNO web-sheet server 140 and provides information for transfer of cellular services from the source device 110 to the target device 150. At 430, the web-sheet server 140 presents terms and conditions information and optionally cellular service plan choices to the target device 150. At 432, the web-sheet server 140 communicates with an MNO provisioning server, e.g., the eSIM server 145, to obtain ICCID values for the eSIMs to be provisioned to the target device 150. At 434, the web-sheet server 140 communicates with appropriate MNO back-end servers, e.g., HSS/BSS server 147, to provision applicable cellular service plan subscriptions to the target device 150. The IMSI value (e.g., phone number) previously assigned to the source device 110 can be reassigned to the target device 150 and associated with a new ICCID value associated with an eSIM to be downloaded to the target device 150. The cellular service plan to be transferred from the source device 110 can be applied to the target device 150 in the back-end server systems. At 436, the IMSI associated with a push token can be updated by the web-sheet server 140 to correspond to an applicable IMSI of the target device 150. At 438, the target device 150 and web-sheet server 140 perform a Javascript callback procedure, which provides to the target device information at 440 for downloading and installing from a provisioning server, e.g., from eSIM server 145, cellular service credentials for one or more eSIMs (having ICCID values). At 442, a user can select which of multiple ICCID values to enable as active at the target device 150. For example, a user may download multiple eSIMs and select which of them are to be active, with the non-selected ones remaining inactive for later possible activation and use. At 442, the target device 150 enters a monitor mode to scan for cellular access networks with which to register and on which to camp. The target device 150 can use information previously installed in a carrier bundle to target device 150 for determining radio network parameters to use for the scan search. At 444, the target device 150 can query the entitlement server 130 to obtain status for a SIM/eSIM (identified by its ICCID value). When the installed eSIM is activated, the target device 150 can obtain in response from the entitlement server 130 an indication that the eSIM is active. At 448, the target device 150 can notify the source device 110 that the ICCID for the installed eSIM is active via a proximity sharing connection or via a network-based cloud service message. In some embodiments, the target device 150, at 450, notifies the source device 110 that the old ICCID, previously used for cellular service access by the source device 110, is now inactive. In some embodiments, the source device 110 can subsequently be deactivated with the MNO, e.g., when no remaining valid eSIMs or SIM cards are installed and/or activated on the source device 110. In some embodiments, at 452, the source device can disable baseband wireless circuitry when no valid eSIMs/SIMs are installed or activated for the source device 110 following the transfer procedure. In some embodiments, at 454, the baseband wireless circuitry of the source device 110 can be disabled based on an error that occurs when attempting to attach to the access network of the cellular wireless network of the MNO for which transfer to the target device 150 of credentials has completed successfully.

Figure 5A:
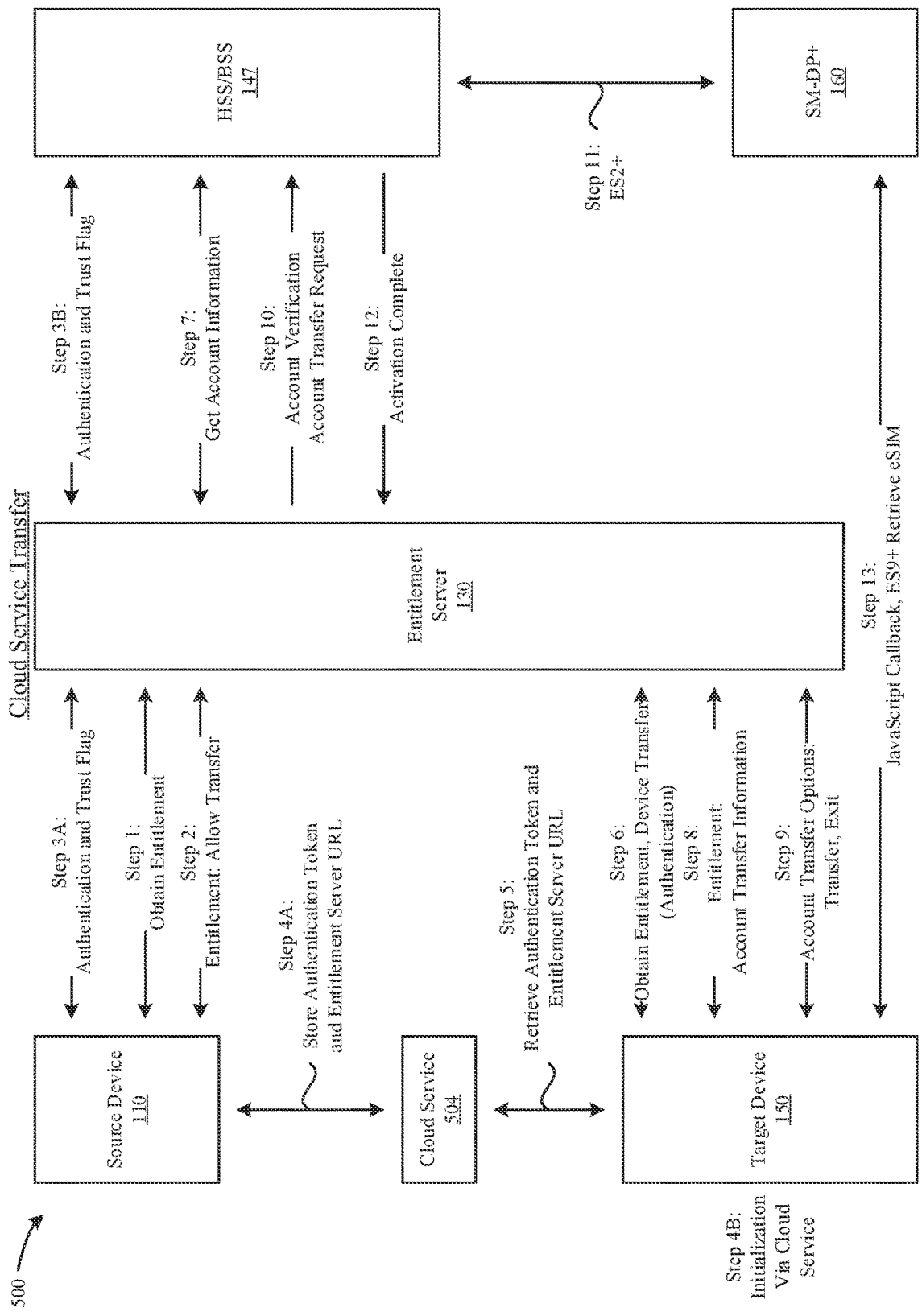
FIG. 5A illustrates a diagram of an exemplary transfer of cellular service account credentials between a source device and a target device via a network-based cloud service, according to some embodiments.

FIG. 5A illustrates a diagram 500 of an exemplary transfer of cellular service account credentials between a source device 110 and a target device 150 via a network-based cloud service. At step 1, the source device 110 obtains authorization for the transfer from the entitlement server 130. At step 2, the source device 110 and the entitlement server 130 interact and agree to allow transfer of one or more cellular service credentials from the source device 110 to another device, e.g., to the target device 150. At steps 3A and 3B, the source device 110 authenticates for the cellular service credential transfer with the MNO HSS/BSS 147 via the entitlement server 130 based at least in part on a trust flag. The entitlement server 130 can provide account transfer information to the source device 110 (and as shown in subsequent steps to the target device 150), while the HSS/BSS 147 (and/or other MNO back-end servers) can transfer (or update) subscription of cellular service account credentials. At step 4A, the source device 110 transfers information for the cellular service credential transfer, e.g., an authentication token and a URL for the entitlement server 130 in a network-based cloud service 504. Notably, steps 1-4A can be performed by the source device 110 separately from initialization of the target device 150, e.g., without knowledge of the specific target device 150 to which transfer of cellular service credentials may subsequently occur. At step 4B, the target device 150 can perform an initialization procedure, e.g., via the network-based cloud service 504. Note that step 4B and 4A, in some embodiments, can be separated in time where the source device 110 preloads the transfer information into the cloud service 504 for later retrieval by the target device 150. This allows for the transfer of cellular service credentials to occur without requiring proximity of the source device 110 to the target device 150. Moreover, in some embodiments, the target device 150 can retrieve information for the cellular service credential transfer from the network-based cloud service 504 without requiring the source device 110 to be powered on or to be connected to the cellular wireless network or to the network-based cloud service 504, as information for the cellular service credential transfer is already stored and ready by completion of step 4A. At step 5, the target device 150 obtains the authentication token and URL for the entitlement server 130 from the network-based cloud service 504. At step 6, the target device 150 authenticates with the entitlement server 130 to effect the cellular service credential transfer. At step 7, the entitlement server 130 obtains service account information from the MNO HSS/BSS 147. At step 8, the target device 150 and the entitlement server 130 exchange account transfer information. At step 9, options to continue or exit the account transfer process are presented via the target device 150. At step 10, when account transfer proceeds (does not exit), account verification with the MNO HSS/BSS 147 and account transfer request occurs. At step 11, the HSS/BSS 147 interacts with the SM-DP+ 160 to prepare for the cellular service credential transfer to the target device 150. At step 12, the MNO HSS/BSS 147 indicates activation completion to the entitlement server 130. At step 13, the target device 150 obtains the cellular service credentials (eSIM(s)) from the MNO SM-DP+ 160 using a JavaScript callback procedure.

Figure 5B:
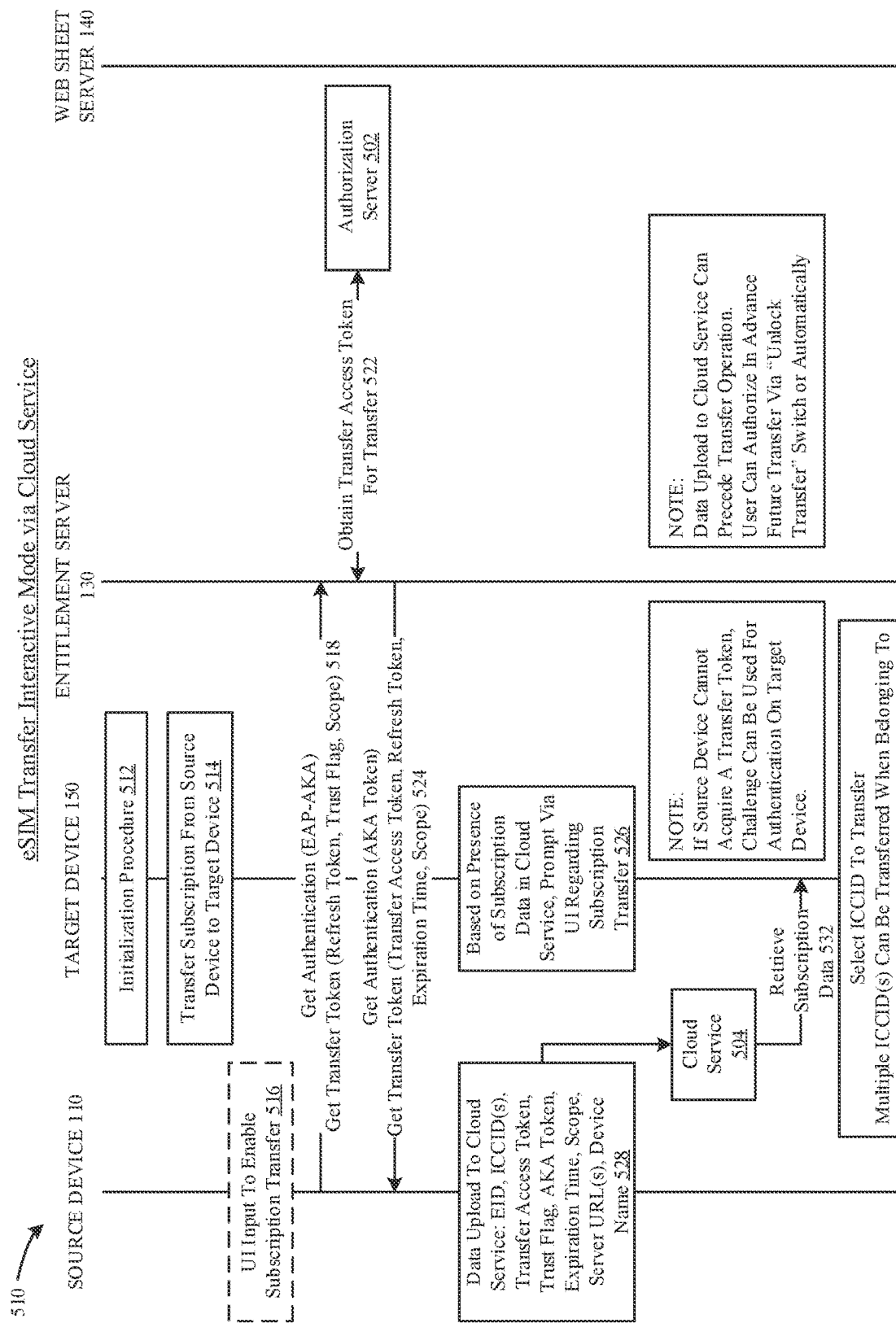
FIGS. 5B through 5D illustrate diagrams of an exemplary transfer of cellular service account credentials using an interactive mode via a network-based cloud service, according to some embodiments.
Figure 5C:
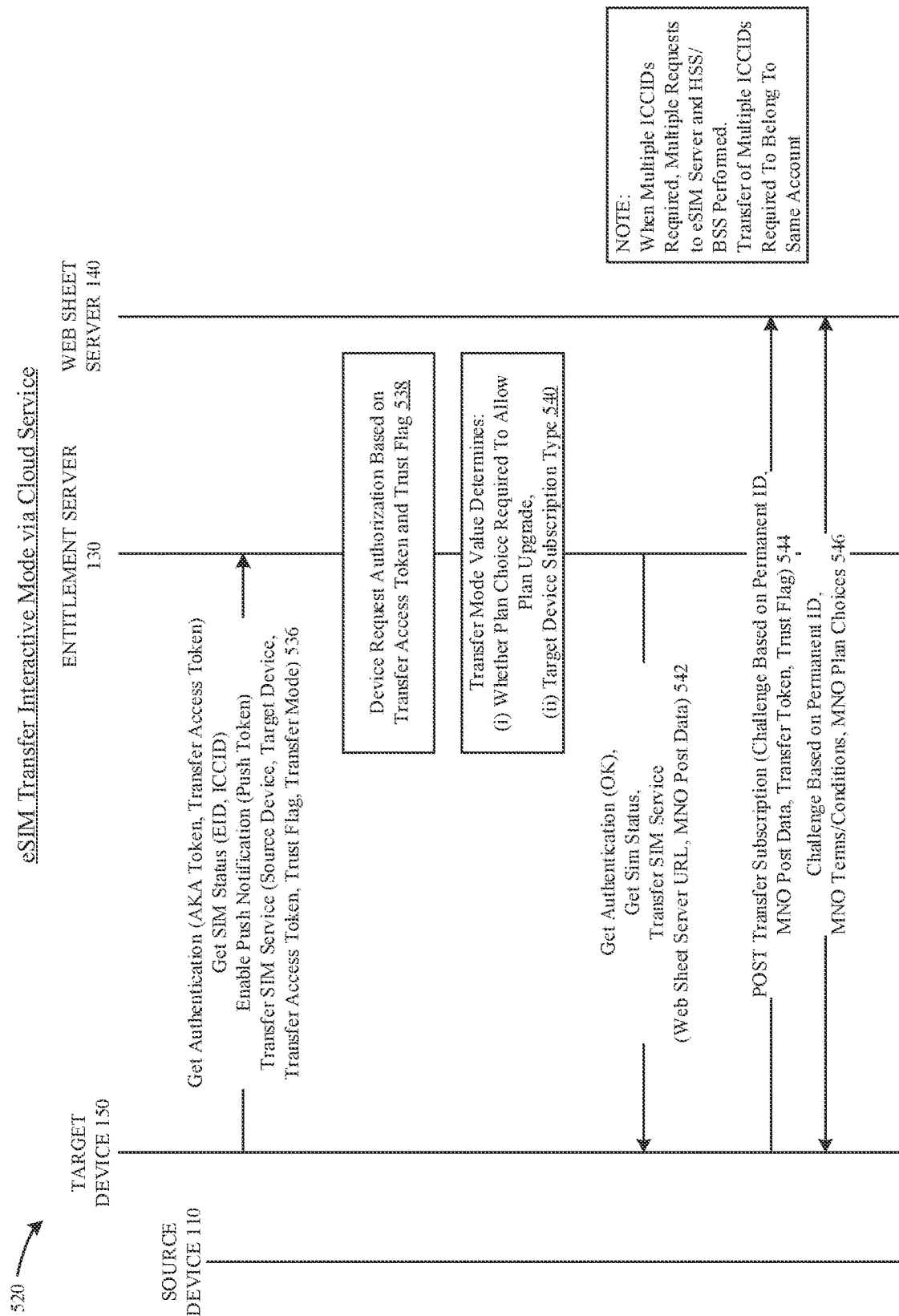
Figure 5D:
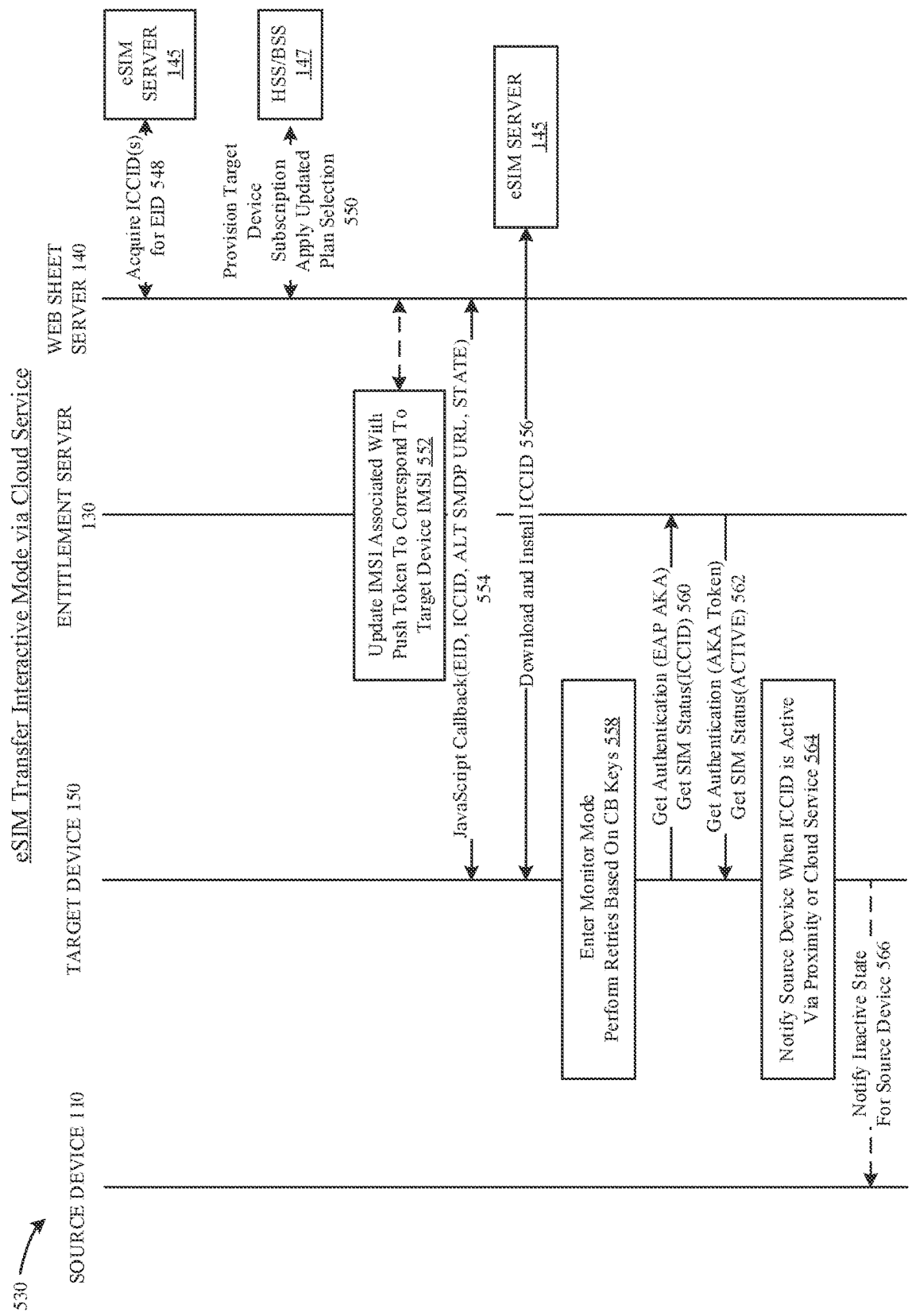

FIGS. 5B, 5C, and 5D illustrates diagrams 510, 520, 530 of an exemplary transfer of cellular service account credentials, e.g., eSIMs, using an interactive mode via a network-based cloud service. The source device 110 uploads data to the cloud service 504, such as unique device/service identifiers, authentication tokens, a trust flag, URLs, etc. for the target device 150 to retrieve subsequently to proceed with transfer of the cellular service credentials associated with an MNO subscription. The flow illustrated allows for transfer of the cellular service credentials using the network-based cloud service so that the source device 110 and target device 150 need not be in proximity to each other. Transfer data is communicated between the source device 110 and the target device 150 via the network-based cloud service 504 rather than via a direct secure proximity connection between the source device 110 and the target device 150. In some embodiments, the interactive mode includes presentation of service plan subscription information and/or options via an MNO web-sheet server.

At 512, an initialization procedure to setup the target device 150 is performed. At 514, an option to transfer one or more cellular service subscription plans from a source device 110 to the target device 150 can be presented to a user via an input/output of the target device 150, and a user can provide an indication to approve a transfer. In some embodiments, at 516, a user can indicate approval via a user interface (UI) input of the source device 110 to allow for transfer of the cellular service subscriptions to the target device 150. At 518, the source device 110 performs an EAP-AKA authentication procedure with the entitlement server 130 and requests a transfer token from the entitlement server 130. The request for the transfer token can include a trust flag that indicates a time-based relationship of the source device 110 and a user account. At 522, the entitlement server 130 obtains from an authorization server 502 a transfer access token for use by the target device 150 to transfer the one or more cellular service subscription plans. At 524, the source device obtains from the entitlement server 130 an AKA token (which can be subsequently used by the target device 150 for authentication with the entitlement server 130 when seeking to transfer the cellular service credentials). The source device also obtains, at 524, a transfer access token with an associated expiration time that limits when the transfer access token can be used. At 528, the source device 110 uploads data to a network-based cloud service, e.g., to cloud service 504, for subsequent retrieval by another device, e.g., by the target device 150, to use for cellular service credential transfer. The data uploaded can include identifiers from the source device 110, e.g., an EID value, ICCID values, as well as one or more tokens for authentication and transfer, a trust flag, network addresses, e.g., URLs and/or FQDNs for provisioning servers, etc. In some embodiments, data upload to the cloud service 504 can precede a transfer operation, and a user can authorize a future transfer of cellular service credentials in advance, e.g., by selecting an unlock transfer switch/setting. In some embodiments, an upload of the cellular service credential transfer data by the source device 110 to the cloud service 504 can automatically (without additional user consent) allow for transfer of the cellular service credentials to another device, e.g., to the target device 150. At 526, the target device 150 can provide a prompt via a user interface regarding options for cellular service subscription (and associated credential) transfer to the target device 150. The prompt can be based at least in part on subscription transfer information being already pre-placed in the cloud service by the source device 110 with which the target device 150 can be associated, e.g., via a common user account. At 532, the target device 150 can obtain from the cloud service 504 cellular service subscription data previously uploaded by the source device 110 to use to assist with transfer of cellular service subscription credentials from the source device 110 to the target device 150. At 534, a user can select one or more cellular service credentials, which can be identified by respective ICCID values, to the target device 150. In some embodiments, multiple cellular service credentials associated with different ICCID values can be transferred during a single transfer process with the different ICCID values are associated with the same MNO and a common cellular service user subscription account. At 536, the target device 150 authenticates with the entitlement server 30, using for example the AKA token and the transfer access token obtained via the cloud service 504. At 536, the target device 150 further obtains status for one or more cellular service credentials, by providing one or more identifiers to the entitlement server 130, e.g., by sending a request for SIM/eSIM status to the entitlement server 130 with an EID of the eUICC of the source device 110 and an ICCID value for an eSIM for which status is requested. At 536, the target device 150 further requests that cellular service credentials for the identified SIM/eSIM be transferred to the target device 150 from the source device 110. The transfer request can include an identifier of the source device 110, an identifier of the target device 150, the previously obtained transfer token, a trust flag, and a mode for transfer. In some embodiments, at 536, the target device 150 additionally requests the push notifications be enabled for the target device 150, e.g., by providing an appropriate push token to the entitlement server 130. At 538, the entitlement server 130 recognizes that the target device 150 requests (and is authorized for) transfer of cellular service credentials based at least in part on the transfer token and trust flag provided by the target device 150. At 540, the entitlement server 130 determines, based on a transfer mode value provided by the target device 150, whether a cellular service plan choice is required, such as to allow for a cellular service plan change or upgrade and a relevant cellular service plan subscription type for the target device 150. At 542, the entitlement server 130 provides an indication to the target device that authentication and authorization for the requested cellular service plan transfer is successful and an indication of a web-sheet server 140 of the MNO with which the target device 150 can further authenticate and authorize transfer of the cellular service credentials. At 544, the target device 150 provides information to the web sheet server 140, which can include data obtained for the cellular service plan transfer obtained from (and/or previously provided to) the entitlement server 130. In some embodiments, as part of the communication at 544 and/or at 546, the target device 150 successfully provides a challenge response to the web-sheet server 140, and the web-sheet server 140 provides an indication of applicable cellular service plan choices and terms and conditions to the target device 150. At 548, the web-sheet server 140 obtains from a provisioning server of the MNO, e.g., the eSIM server 145, a set of one or more eSIMs (with associated ICCID values) to provide to the target device 150. The web-sheet server 140 also communicates with applicable MNO back-end servers, such as HSS/BSS 147, at 550, to provision to the target device updated cellular service plan selections. At 552, the web-sheet server 140 can update a push token for an IMSI for a cellular service plan transferred to correspond to the target device 150. At 554, the target device can participate in a Javascript callback procedure with the web-sheet server 140 to obtain a network address for an MNO provisioning server, e.g., for eSIM server 145, from which to subsequently, at 556, download and install the eSIMs associated with the ICCID values assigned to the target device 150. At 558, the target device 150 can enter a network monitor mode to scan for access network of the cellular wireless network with which to associate, register, and camp on. In some embodiments, the target device 150 uses information in a carrier bundle previously installed in the target device 150 to determine parameters for the access network search. At 560/562, the target device 150 can determine based on communication with the entitlement server 130 that the cellular service plan(s) are activated for the target device 150. At 564, the target device 150 can notify the source device 110 when the cellular service plans have been transferred via a proximity sharing connection or via a network-based cloud service message. In some embodiments, at 566, the target device 150 indicates to the source device 110 that the cellular service credentials transferred are now inactive for the source device 110.

Figure 6A:
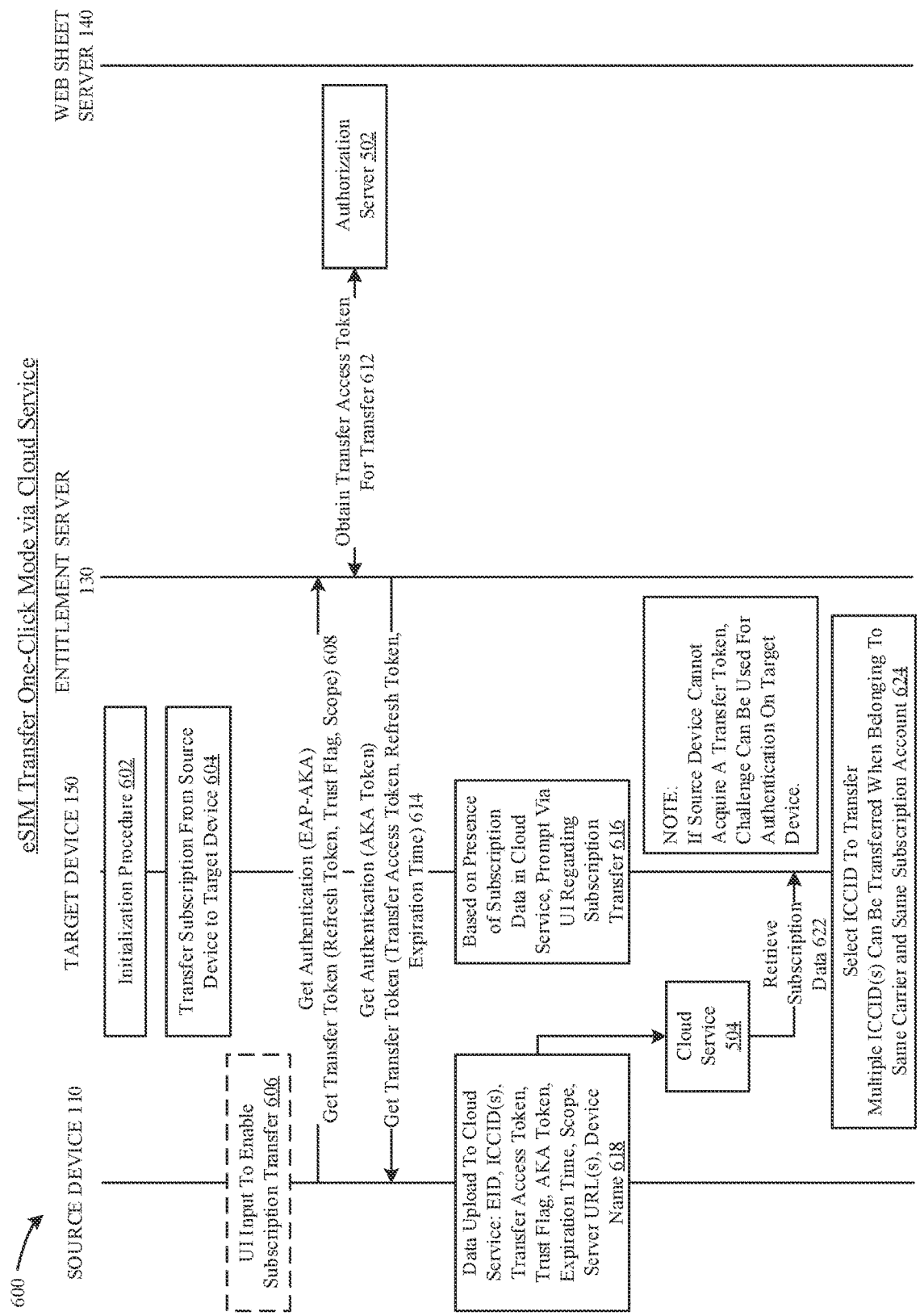
FIGS. 6A through 6C illustrate diagrams of an exemplary flow to transfer cellular service account credentials using a one-click mode via a network-based cloud service, according to some embodiments.
Figure 6B:
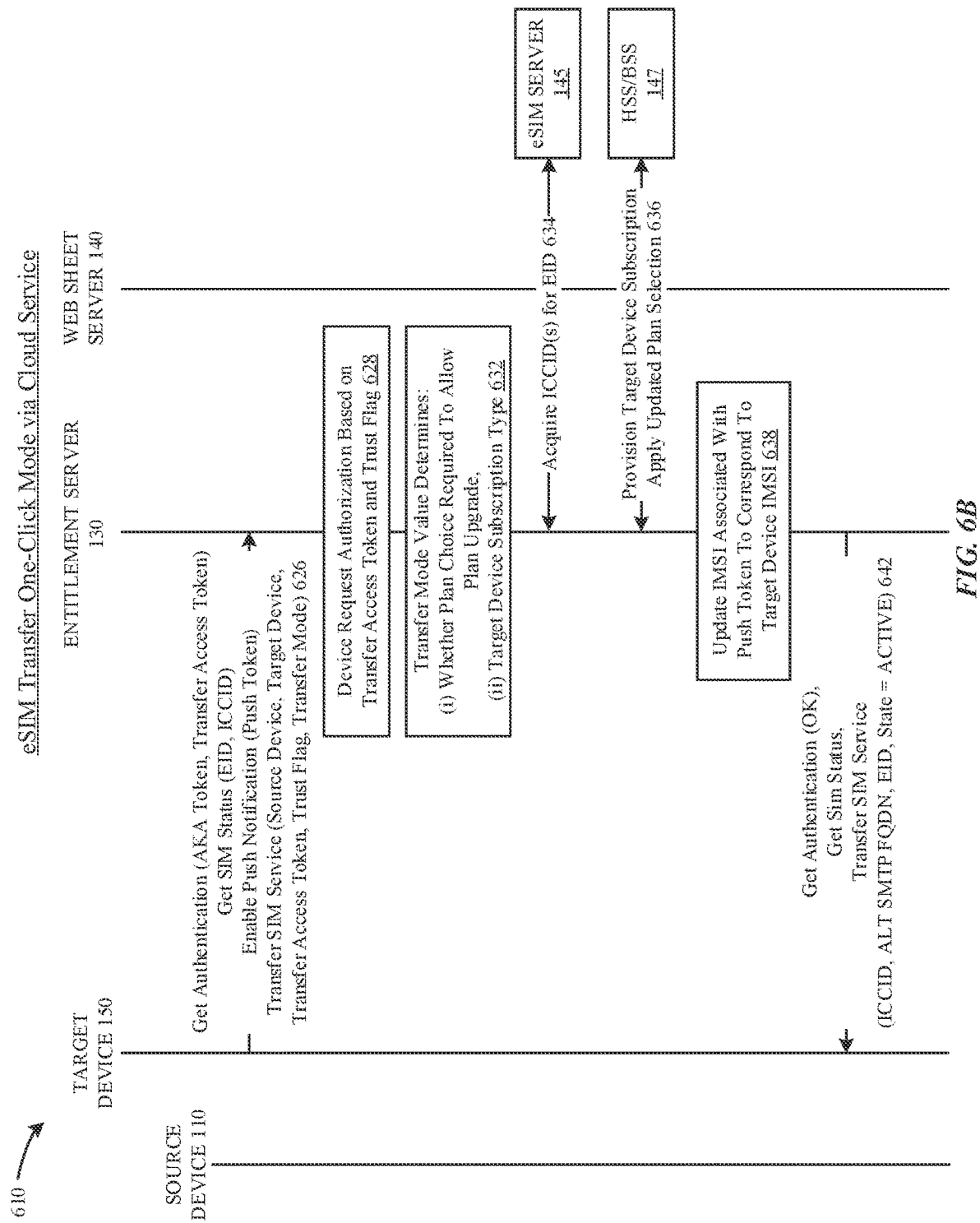
Figure 6C:
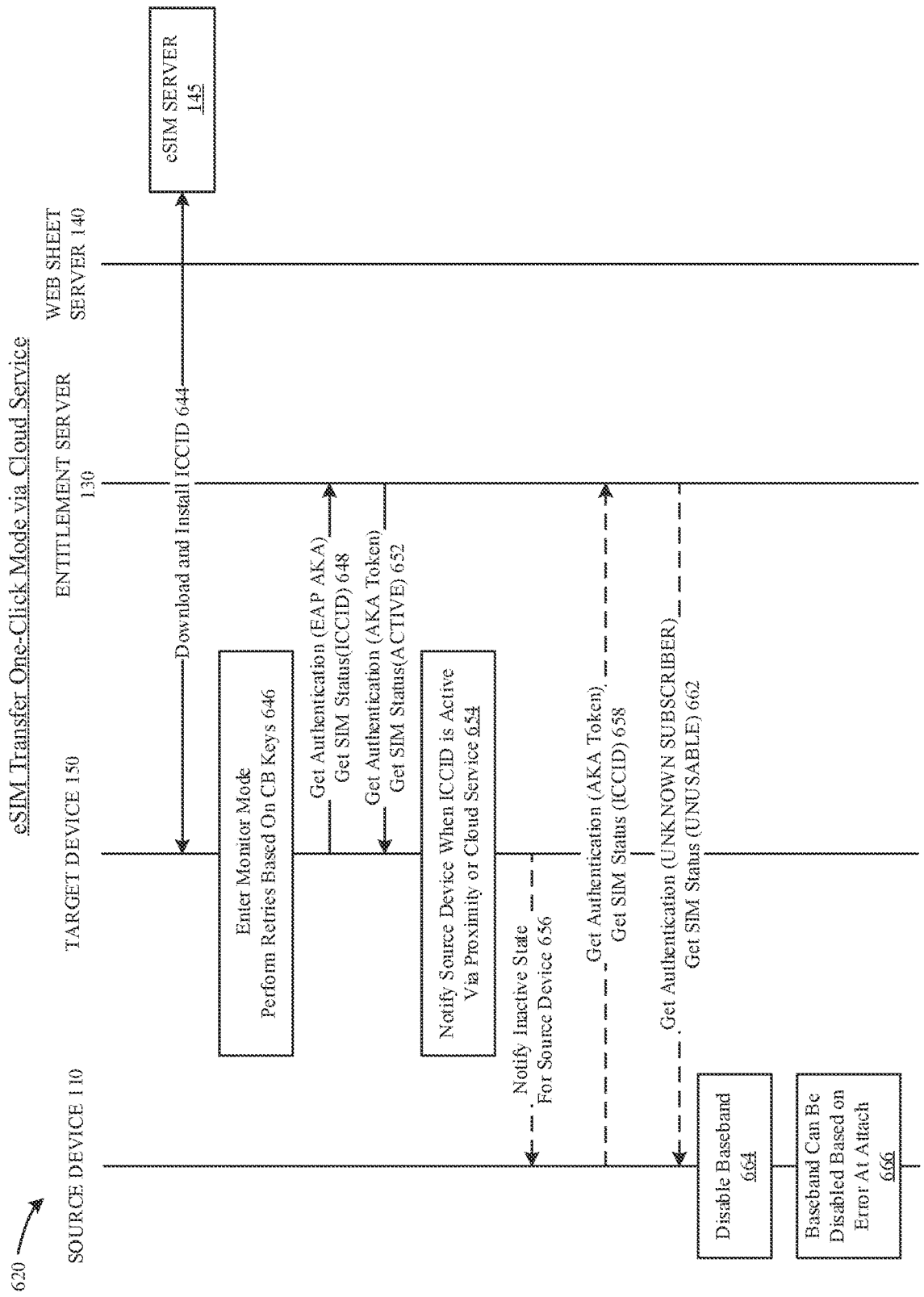

FIGS. 6A, 6B, and 6C illustrate diagrams 600, 610, 620 of an exemplary flow to transfer cellular service account credentials, e.g., eSIMs, using a one-click mode via a network-based cloud service. The procedure illustrated in FIGS. 6A, 6B, and 6C allows for bypassing interaction with an MNO web-sheet server 140 based on the target device 150 presenting valid authentication data, e.g., tokens, a trust flag, etc. obtained by the target device 150 from the source device 110 via the network-based cloud service. In some embodiments, multiple credentials, e.g., multiple eSIMs can be transferred between devices, e.g., from the source device 110 to the target device 150, at one time, rather than requiring transfer and authentication of each eSIM individually. In some embodiments, each credential/eSIM is associated with a unique transfer token, which can be obtained in parallel from the network-based cloud service by the target device 150 and presented together to allow for transfer of multiple eSIMs. At 602, an initialization procedure to setup the target device 150 is performed. At 604, an option to transfer one or more cellular service subscription plans from the source device 110 to the target device 150 can be presented to a user via a user interface of the target device 150. At 606, optionally, a user can provide an indication via a user interface of the source device 110 to enable transfer of one or more cellular service subscription plans to the target device 150. At 608, the source device 110 performs an EAP-AKA procedure to authenticate with the entitlement server 130 and requests from the entitlement server 130 a transfer token. The source device 110, in some embodiments, can provide a trust flag, which can be used to indicate a relationship between the source device 110 and a user account by which the entitlement server 130 can determine whether to honor the request for providing the requested token to the source device 110. The trust flag can be used for indicating authorization for a requested cellular service credential transfer (or for other management procedures for cellular service credentials) and can bypass customary requirements for a cellular service account login and password with the entitlement server 130. At 612, the entitlement server 130 obtains one or more transfer access tokens from an authorization server 502 to use for transfer of one or more associated cellular service credentials. At 614, the entitlement server 130 responds to the source device with an AKA token, which can indicate authentication of the source device 110 was successful, and can provide the one or more transfer access tokens to the source device 110 along with an indication of expiration time(s) for the transfer access tokens. The source device 110, at 618, can upload to a network-based cloud service 504 the obtained transfer access tokens along with additional data useful for transfer of associated cellular service credentials to another mobile wireless device. Additional data can include hardware identifiers for the source device 110, e.g., an EID of an eUICC in the source device 110, one or more ICCID values for SIMs/eSIMs installed in the source device 110, a trust flag, an AKA token, network addresses, e.g., URLs and/or FQDNs, for one or more network provisioning servers from which to obtain applicable cellular service credentials, e.g., eSIMs, to download to another mobile wireless device. The set of data uploaded to the cloud service 504 can be referred to as subscription data. At 616, based on presence of subscription data in the cloud service 504, the target device can provide a prompt via a user interface regarding subscription transfer. At 622, the target device 150, which can be associated with a common user account, e.g., for the network-based cloud service, can retrieve from the cloud service 504 all or part of the subscription data previously uploaded by the source device 110. In some embodiments, when the source device 110 is unable to acquire a transfer access token for transfer of a cellular service credential, the target device 150 can provide a response to a challenge from the entitlement server 130, e.g., provide a valid user login identifier and password for a cellular service user account, to authenticate and provide authorization to request transfer of one or more cellular service account credentials to the target device 150. At 624, a user can select one or more cellular service account credentials, e.g., identified by ICCID values, to transfer from the source device 110 to the target device 150. In some embodiments, multiple cellular service credentials can be transferred to the target device 150 when belonging to a common MNO and an identical cellular service user subscription account. At 626, the target device 150 authenticates with the entitlement server 130 using the AKA token and the transfer access token obtained from the cloud service 504. In some embodiments, at 626, the target device 150 requests push notification to be enabled for the target device 150 for a particular push token (which may have been previously used for push notifications to the source device 110). In some embodiments, at 626, the target device 150 further requests that cellular account service credentials for one or more SIMs/eSIMs be transferred from the source device 110 to the target device 150. The request to transfer the cellular service account credentials can include identifiers for the source device 110 and target device 150 as well as applicable tokens for indicating authorization to transfer the cellular service account credentials, e.g., one or more transfer access tokens and a trust flag obtained from the cloud service 504. At 628, the entitlement server 130 can determine whether the target device 150 is authorized for the transfer request based at least in part on the transfer access token and trust flag provided by the target device 150. At 632, the entitlement server 130 determines an applicable subscription type for the target device 150 and whether a cellular service plan choice is required of a user of the target device 150 in order to transfer one or more of the cellular service account credentials to the target device 150. This determination can be based at least in part on a transfer mode value provided by the target device 150 to the entitlement server 130 in the transfer request at 626. At 634, the entitlement server 130 can obtain from a provisioning server, e.g., eSIM server 145, a set of one or more cellular service account credentials, e.g., eSIMs with associated ICCID values, for installation on the eUICC of the target device 150, where the eUICC can be identifier by a particular EID value. At 636, the entitlement server 130 can communicate with one or more network back-end servers, e.g., HSS/BSS 147, to provision to the target device 150 subscription for one or more of the requested cellular service account credentials and can indicate a selection cellular service account subscription plan, which can be an upgrade or update from a previously selected plan. At 638, the entitlement server 130 can update an IMSI value associated with a push token to corresponds to the target device 150, which can be reassigned an IMSI value previously assigned to the source device 110, or which in some cases can be a different IMSI value. At 642, the entitlement server 130 can indicate to the target device 150 successful authentication and can indicate successful transfer of one or cellular service credentials to the target device 150. Note that at 642, the internal MNO network servers are updated with information regarding service for one or more cellular service credentials for the target device 150; however, the actual cellular service credentials have yet to be downloaded to the target device 150. At 642, the entitlement server 130 further provides information to assist the target device 150 to complete transfer of the one or more cellular service credentials. The information can include one or more ICCID values, one or more network addresses for provisioning servers, e.g., URLs and/or FQDNs, as confirmation of an EID value for the eUICC of the target device 150, and an indication of an active state for the requested transferred cellular service account credentials. At 644, the target device 150 downloads and installs one or more cellular service credentials, e.g., eSIMs associated with respective ICCID values, from a network provisioning server, e.g., eSIM server 145. At 646, the target device 150 enters a monitor mode to scan for cellular access networks with which to associate and camp on. The target device 150 can use radio frequency scan information included in a previously installed carrier bundle. After camping on an applicable access network, the target device 150, at 648, can perform an EAP AKA procedure with the entitlement server 130 and obtain a status for a cellular service credential, e.g., requesting status of a SIM/eSIM corresponding to a particular ICCID value. The entitlement server 130, at 652, can indicate successful authentication of the target device 150 by responding with an AKA token and indicate that the requested SIM/eSIM status is active. At 654, the target device 150 can notify the source device 110 that the transferred cellular service credential is active for the target device 150. Notification can occur via a proximity-based direct connection or via a network-based cloud service. At 656, in some embodiments, the target device 150 notifies the source device 110 of an inactive state of the transferred cellular service credential for the source device 110. At 658, the source device 110 can send an authentication message to the entitlement server 130 using a previously used AKA token and can also send a message requesting status for the eSIM associated with the old ICCID value. As the eSIM is no longer usable for the source device 110, having been transferred to the target device 150, the entitlement server 130 is unable to authenticate the source device with the provided AKA token and returns, at 662, an authentication message with an error indication of an unknown subscriber as well as an unusable status indication for the eSIM. At 664, the source device 110 can disable baseband wireless circuity contained therein when no valid eSIMs/SIMs are installed or active for the source device 110 following the transfer procedure. In some embodiments, at 666, the baseband wireless circuitry of the source device 110 can be disabled based on an error that occurs when attempting to attach to the access network of the cellular wireless network of the MNO for which transfer of credentials to the target device 150 has completed successfully.

Trust Based Authentication

FIGS. 7A, 7B, 7C, 7D, and 7E illustrate diagrams 700, 730, 750, 770, and 790 of examples of using a shared secret key (shared secret data) to establish trust and allow for authentication of a SIM/eSIM of a mobile wireless device, e.g., source device 110, with an MNO server 702, e.g., an entitlement server 130 or an authorization server 502, without requiring use of a cellular service account login and password.

Figure 7A:
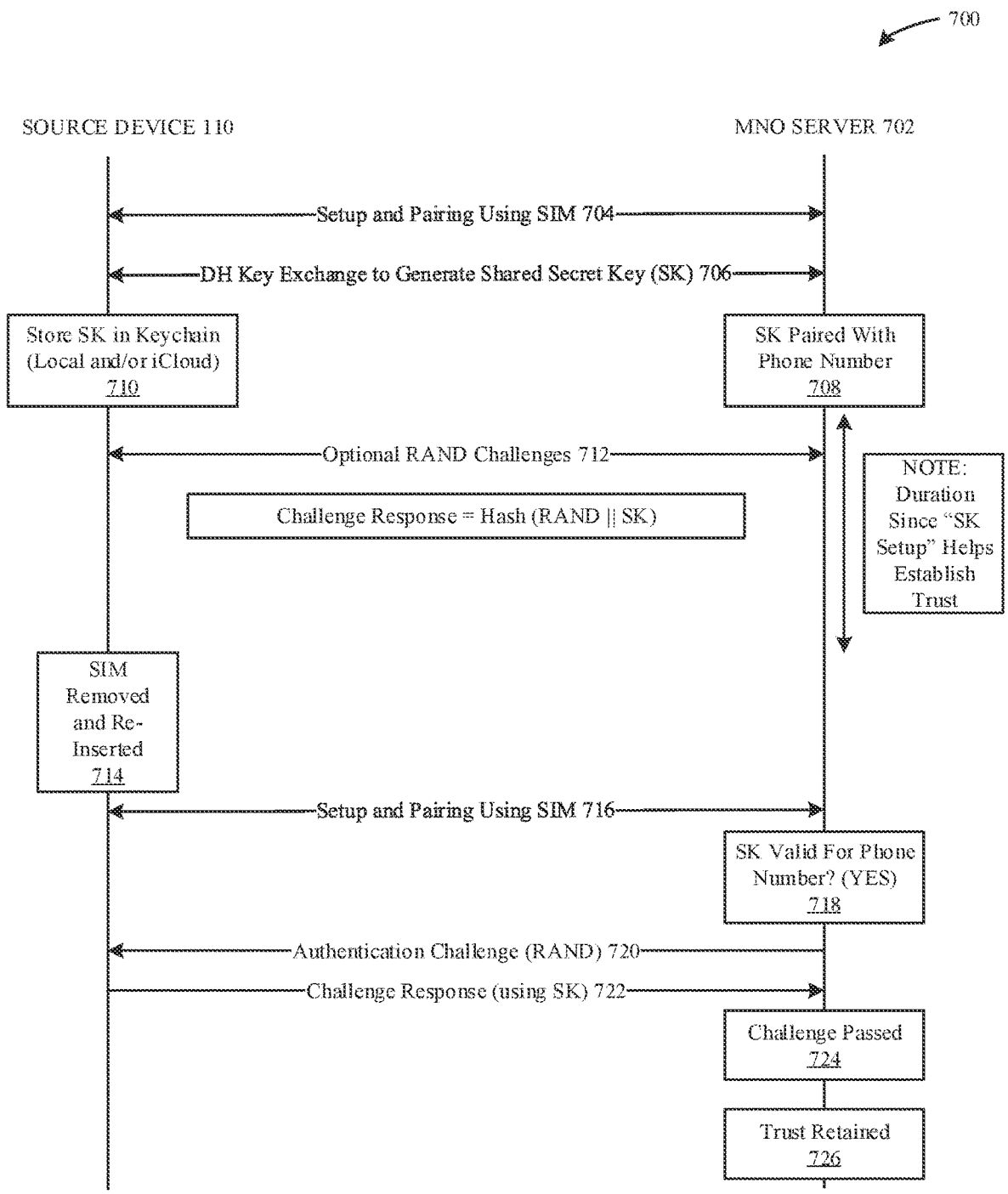
FIGS. 7A through 7E illustrate diagrams of examples of using a shared secret key to establish trust and allow for authentication of a cellular service account credential of a device with an MNO server, according to some embodiments.

As shown in FIG. 7A, during establishment of an association of a SIM/eSIM to the source device 110, e.g., at 704, after initial setup and pairing of a SIM/eSIM in the source device 110 with an MNO server 702, the source device 110 and the MNO server 702, at 706, generate shared secret data, referred to herein as a shared secret key (SK), such as based on a Diffie-Hellman (DH) key exchange or other comparable public/private encryption scheme. The SK can be associated, at 708, with a particular SIM/eSIM, and therefore with a particular mobile identification number, e.g., a phone number, also referred to as an IMSI, of the source device 110. The SK can be stored, at 710, in secure storage external to the secure element that stores the SIM/eSIM(s) of the source device 110, e.g., in a secure keychain. The SK can also be stored separately in a network-based cloud service, e.g., at an iCloud server. A time duration since the establishment of the SK can be used as part of evaluating a trust score for the source device 110. The SK can be used in conjunction with challenge/response procedures to verify that the source device 110 retains the SK established for the SIM/eSIM. At 712, the source device 110 can communicate with the MNO server 702, which can provide a random number (RAND) challenge to which the source device 110 can provide a challenge response based on a hash of the RAND value and the previously established SK. The SIM/eSIM can be removed/deactivated and subsequently re-installed/re-activated in the device, at 714, and the source device 110 can pair with the MNO server 702 using the re-installed/re-activated SIM. The source device 110 can be verified by the MNO server 702 using the previously established SK. For example, the MNO server 702 can determine, at 718, whether the SK is valid of a particular mobile identifier, e.g., a phone number (IMSI value) provided by the source device 110. When an SK value is valid for the IMSI value, the MNO server 702 can issue an authentication challenge, at 720, to the source device 110, which can respond, at 722, with an appropriate challenge response based at least in part on the SK. The authentication challenge and challenge response can prove that the source device 110 possesses the SK. When the challenge passes, as determined by the MNO server 702 at 724, the MNO server 702 can determine, at 726, that a previously established trust relationship for the SK and the phone number (IMSI value) is retained by the source device 110.

Figure 7B:
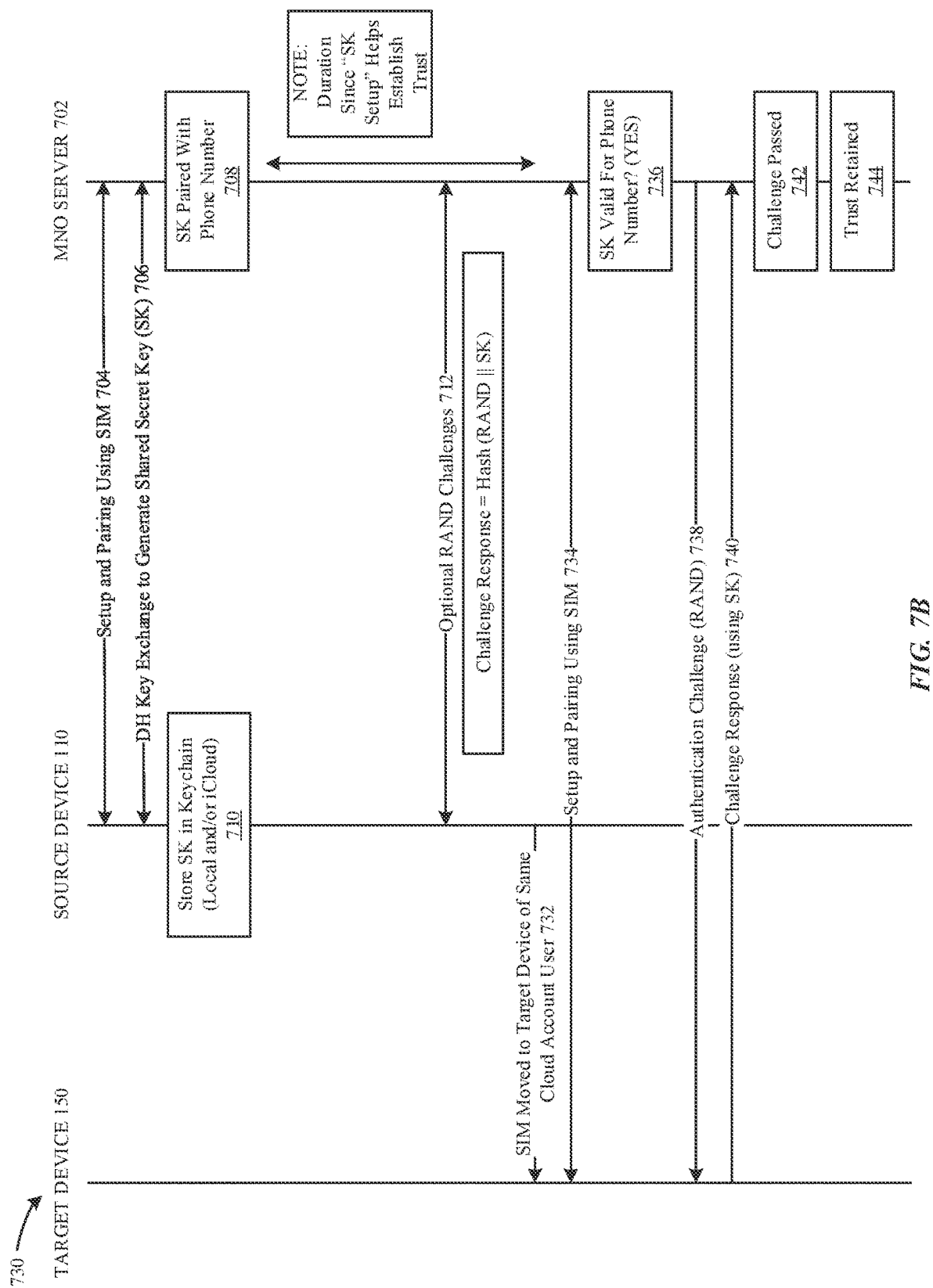

As shown in FIG. 7B, the trust relationship between a first device, e.g., source device 110, and the MNO server 702 can be transferred to a second device, e.g., target device 150, when transferring a cellular service credential, e.g., a SIM/eSIM, between the source device 110 and the target device 150, and the target device 150 can demonstrate possession of a previously established shared secret key (SK). The SK can be stored external to the source device 110, e.g., in a secure network-based cloud storage service that retains encrypted information for the source device 110. The target device 150, when associated with a common user account that also is associated with the source device 110 (and as allowed by a user of the source device 110 and the target device 150) can access the SK stored locally (or remotely in the cloud storage service) in the keychain of the source device 110. For example, the target device 150, when permitted by the user, can obtain information from the keychain of the source device 110 via the network-based cloud service, including accessing the previously established SK for a SIM/eSIM that is moved from the source device 110 to the target device 150. The target device 150 can demonstrate possession of the SK as part of the authentication challenge/response procedure used by the MNO server 702 to validate the target device 150. When the target device 150 can respond successfully to the challenge, e.g., based on the previously established SK, the MNO server 702 can trust the target device 150. The existing trust relationship for the source device 110 can thus transfer with the SIM/eSIM to the target device 150, when the associated SK for the transferred SIM/eSIM also is available to the target device 150.

Initially, at 704, the source device 110 pairs with the MNO server 702 based on a cellular service credential, e.g., SIM/eSIM. Subsequently, at 706, the source device 110 and the MNO server use a Diffie-Hellman (DH) key exchange (or comparable public/private encryption scheme) to generate a shared secret key (SK). The SK can be stored securely at the source device 110, e.g., in a keychain, and can also be stored securely at a cloud-based service, e.g., in a keychain of an iCloud account. The SK can be paired, at 708, with an identifier associated with a SIM/eSIM of the source device 110, e.g., an IMSI value (phone number). The source device 110 can demonstrate possession of the SK by responding to a random number (RAND) challenge provided by the MNO server 702 at 712 with an appropriate challenge response, e.g., with a hash value that is based on a combination of the RAND and the SK. The MNO server 702 can determine that the source device 110 continues to retain the SK based on the appropriately provided challenge response and maintain a trust relationship based at least in part on a duration of time elapsed from SK setup to continued demonstration of possession of the SK. At 732, a SIM/eSIM can be moved from the source device 110 to the target device 150, where the target device 150 and the source device 110 are associated with a common user account, e.g., an identical iCloud account. The target device 150, at 734, can pair with the MNO server 702 using the SIM/eSIM that was transferred from the source device 110. At 736, the MNO server 702 can determine whether there exists a valid SK for the SIM/eSIM (and its associated phone number). When there does exist a valid SK (with an implied trust relationship), the MNO server 702 can determine whether the target device 150, which paired with the SIM/eSIM, also possesses the associated SK. At 738, the MNO server 702 issues an authentication challenge to the target device 150 based on a random (RAND) value. The target device 150, at 740, replies to the MNO server 702 with a challenge response that is based on the RAND value and the SK associated with the SIM/eSIM that was used for pairing at 734. When the MNO server 702 determines, at 742, that the challenge response is valid (appropriately based on the SK), the MNO server 702 can determine that the target device 150 possesses the SK corresponding to the SIM/eSIM, and at 744, the trust relationship established for the SK can be retained and associated with the target device 150.

Figure 7C:
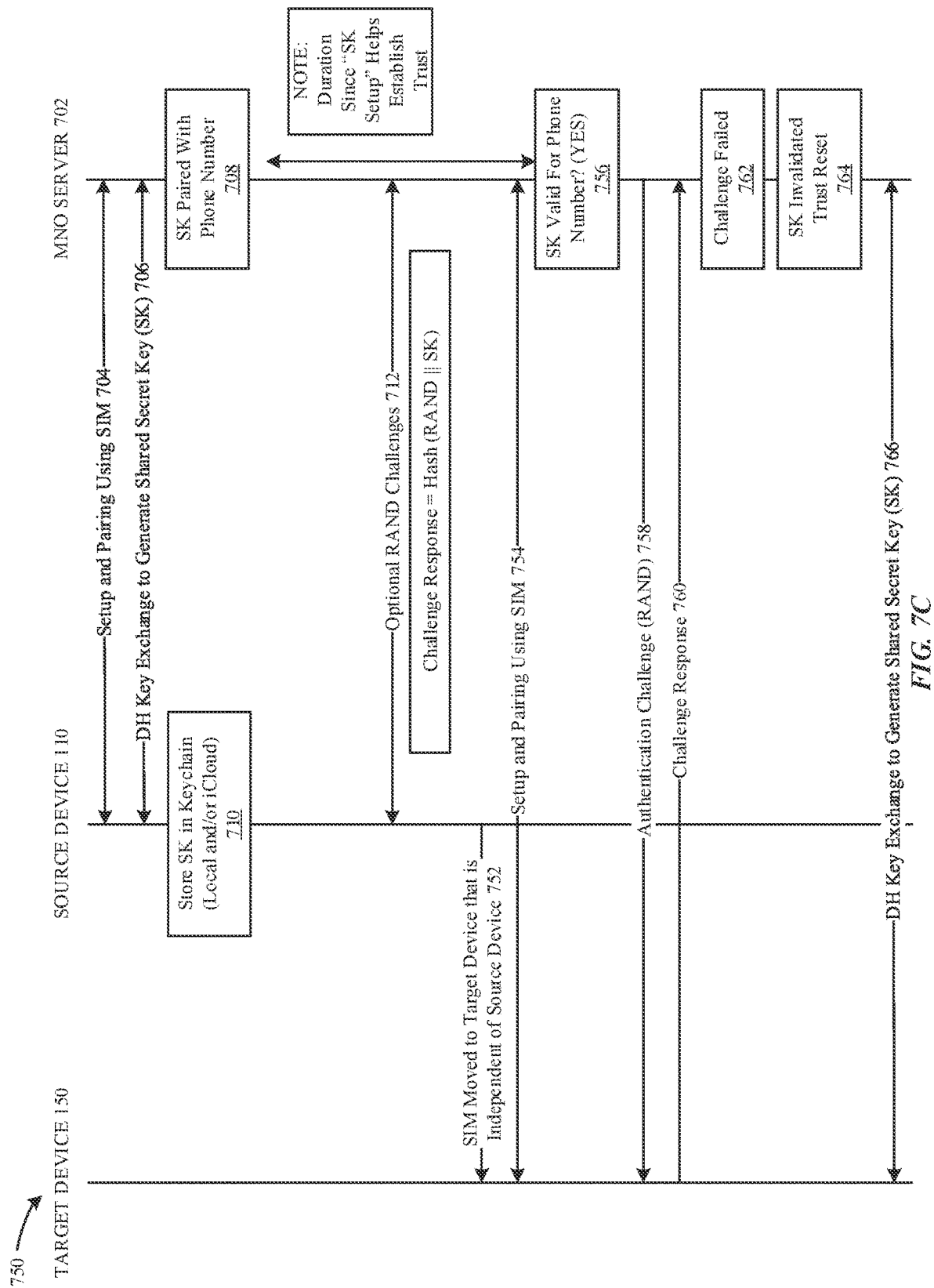

As shown in FIG. 7C, a trust relationship for a SIM/eSIM associated with a previously established SK can be invalidated when a second device, e.g., target device 150, attempts to authenticate with the MNO server 702 and does not possess the previously established SK. For example, a SIM/eSIM may be installed in the target device 150, where the target device 150 is not associated with the same user account as the source device 110. While the SIM may be valid for authentication with the MNO server 702, the target device 150 cannot access the SK, as the target device 150 does not have access, e.g., via a network-based cloud service account, to the secure encrypted keychain information of the source device 110. As such the target device 150 cannot successfully respond to a challenge that uses the SK from the MNO server 702, and the challenge/response procedure fails. The MNO server 702 can determine that the SIM/eSIM is being used by a new device and can require that a new SK be established with the target device 150. The trust relationship for the new SK can be set to a zero time duration and trust (based on a length of time that the new SK has been associated with the SIM/eSIM) must be rebuilt.

Initially, at 704, the source device 110 pairs with the MNO server 702 based on a cellular service credential, e.g., SIM/eSIM. Subsequently, at 706, the source device 110 and the MNO server 702 use a Diffie-Hellman (DH) key exchange (or comparable public/private encryption scheme) to generate a shared secret key (SK). The SK can be stored securely at the source device 110, e.g., in a keychain, and can also be stored securely at a cloud-based service, e.g., in a keychain of an iCloud account. The SK can be paired, at 708, with an identifier associated with a SIM/eSIM of the source device 110, e.g., an IMSI value (phone number). The source device 110 can demonstrate possession of the SK by responding to a random number (RAND) challenge provided by the MNO server 702 at 712 with an appropriate challenge response, e.g., with a hash value that is based on a combination of the RAND and the SK. The MNO server 702 can determine that the source device 110 continues to retain the SK based on the appropriately provided challenge response and maintain a trust relationship based at least in part on a duration of time elapsed from SK setup to continued demonstration of possession of the SK. At 752, a SIM/eSIM can be moved from the source device 110 to the target device 150, where the target device 150 and the source device 110 are not associated with a common user account, e.g., use different iCloud accounts or have no relationship to each other. The target device 150, at 754, can pair with the MNO server 702 using the SIM/eSIM that was transferred from the source device 110. At 756, the MNO server 702 can determine whether there exists a valid SK for the SIM/eSIM (and its associated phone number). When there does exist a valid SK (with an implied trust relationship), the MNO server 702 can determine whether the target device 150, which paired with the SIM/eSIM, also possesses the associated SK. At 758, the MNO server 702 issues an authentication challenge to the target device 150 based on a random (RAND) value. At 760, the target device 150 provides to the MNO server 702 a challenge response. As the target device 150 does not possess the SK, the challenge response fails when checked by the MNO server 702 at 762. At 764, the MNO server 702 can conclude that the pairing of the SK, which is not possessed by the target device 150, with the phone number associated with the SIM/eSIM installed in the target device 150 is no longer valid, and a new trust relationship must be established. Thus, the trust relationship between the previous SK and the phone number for the SIM/eSIM is reset at 764. Subsequently, at 766, the target device 150 and the MNO server 702 use a Diffie-Hellman (DH) key exchange (or comparable public/private encryption scheme) to generate a new shared secret key (SK), which can be stored securely at the target device 150, e.g., in its own keychain, and can also be stored securely in a cloud-based service, e.g., in a keychain of an iCloud account associated with the target device 150. A trust relationship between the new SK and the phone number is restarted by the MNO server 702 and managed based on challenge/response exchanges between the MNO server 702 and the target device 150, where the target device 150 provides proof of possession of the new SK to the MNO server 702.

Figure 7D:
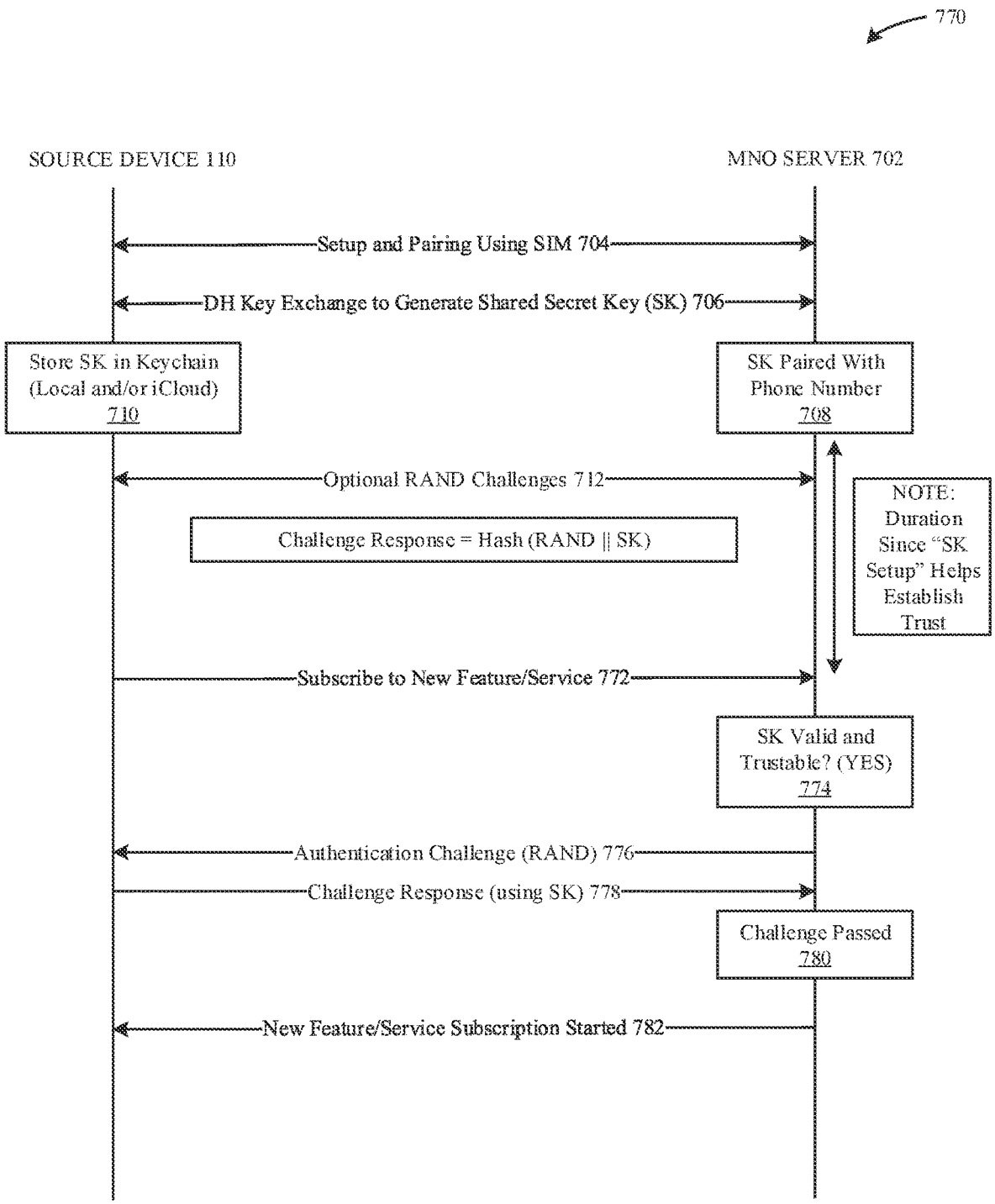

As shown in FIG. 7D, a trust relationship based on an established SK can be used for validation of a device, e.g., source device 110, with a network server, e.g., MNO server 702, to perform certain cellular service management operations, such as to subscribe to a new feature or service or to change a feature or service for a SIM/eSIM installed (or to be installed) in the source device 110. The MNO server 702 can require that the source device 110 provide a valid response based on a challenge that uses the SK to prove that the source device 110 still possesses the SK (and does not simply possess the eSIM/SIM). Before allowing access to new/changed features or services, the MNO server 702 can reconfirm the trust relationship based on the established SK.

Initially, at 704, the source device 110 pairs with the MNO server 702 based on a cellular service credential, e.g., SIM/eSIM. Subsequently, at 706, the source device 110 and the MNO server 702 use a Diffie-Hellman (DH) key exchange (or comparable public/private encryption scheme) to generate a shared secret key (SK). The SK can be stored securely at the source device 110, e.g., in a keychain, and can also be stored securely at a cloud-based service, e.g., in a keychain of an iCloud account. The SK can be paired, at 708, with an identifier associated with a SIM/eSIM of the source device 110, e.g., an IMSI value (phone number). The source device 110 can demonstrate possession of the SK by responding to a random number (RAND) challenge provided by the MNO server 702 at 712 with an appropriate challenge response, e.g., with a hash value that is based on a combination of the RAND and the SK. The MNO server 702 can determine that the source device 110 continues to retain the SK based on the appropriately provided challenge response and maintain a trust relationship based at least in part on a duration of time elapsed from SK setup to continued demonstration of possession of the SK. At 772, the source device 110 can send a request to the MNO server 702 to perform a management operation for a SIM/eSIM installed (or to be installed) in the source device 110, e.g., to subscribe to a new feature of service for the SIM/eSIM. At 774, the MNO server 702 can determine whether there exists a valid SK for the SIM/eSIM (and its associated phone number). When there does exist a valid SK (with an implied trust relationship), the MNO server 702 can determine whether the source device 110, which previously paired with the SIM/eSIM, continues to possess the associated SK. At 776, the MNO server 702 issues an authentication challenge to the source device 110 based on a random (RAND) value. At 778, the source device 110 provides to the MNO server 702 a challenge response using the stored SK. At 780, the MNO server 702 confirms that the challenge passes, and at 782, the MNO server provides an indication to the source device 110 that a new feature and/or service as requested has been started for cellular service subscription associated with the SIM/eSIM of the source device 110.

Figure 7E:
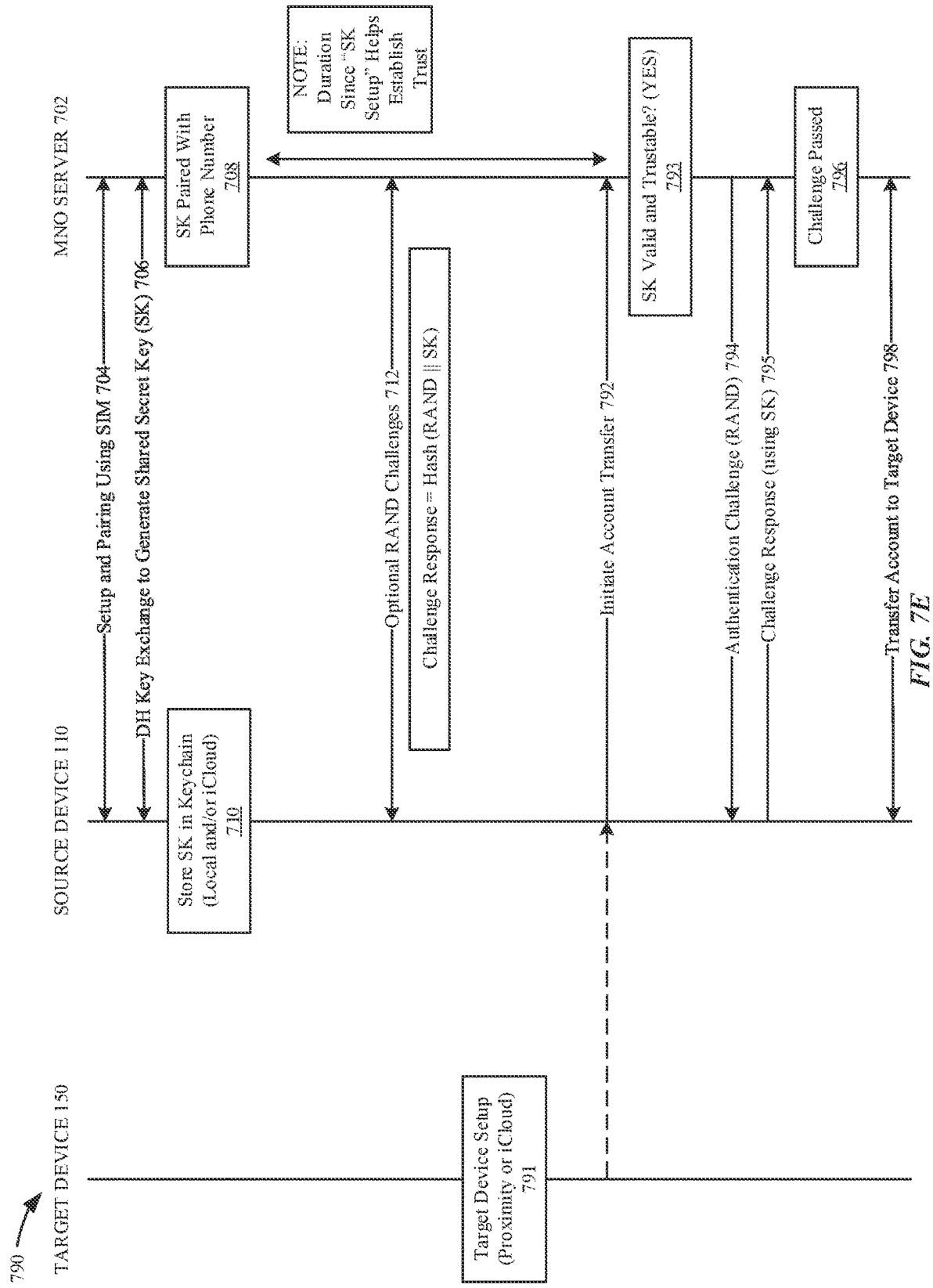

As shown in FIG. 7E, in some embodiments, transfer of an account from a first device, e.g., source device 110, to a second device, e.g., target device 150, can require that the source device 110 prove possession of the SK before allowing transfer of an account to the target device 150. When the source device 110 can demonstrate possession of the SK, e.g., by successfully responding to a challenge that is based on the previously established SK, the MNO server 702 can allow for initiating transfer of a service, an account, a credential, an eSIM, a set of eSIMs, or the like from the source device 110 to the target device 150. When the source device 110 cannot demonstrate possession of the SK, e.g., by not being able to successfully respond to the challenge that is based on the SK, the MNO server 702 can disallow transfer of requested services, accounts, credentials, etc. to the target device 150.

Initially, at 704, the source device 110 pairs with the MNO server 702 based on a cellular service credential, e.g., SIM/eSIM. Subsequently, at 706, the source device 110 and the MNO server 702 use a Diffie-Hellman (DH) key exchange (or comparable public/private encryption scheme) to generate a shared secret key (SK). The SK can be stored securely at the source device 110, e.g., in a keychain, and can also be stored securely at a cloud-based service, e.g., in a keychain of an iCloud account. The SK can be paired, at 708, with an identifier associated with a SIM/eSIM of the source device 110, e.g., an IMSI value (phone number). The source device 110 can demonstrate possession of the SK by responding to a random number (RAND) challenge provided by the MNO server 702 at 712 with an appropriate challenge response, e.g., with a hash value that is based on a combination of the RAND and the SK. The MNO server 702 can determine that the source device 110 continues to retain the SK based on the appropriately provided challenge response and maintain a trust relationship based at least in part on a duration of time elapsed from SK setup to continued demonstration of possession of the SK. At 791, the target device 150 can perform a setup procedure, e.g., via a proximity sharing connection with the source device 110 and/or via a connection to a network-based cloud service, e.g., to an iCloud account. The target device 150 can directly (or indirectly) cause the source device 110 to initiate a cellular service account transfer, at 792, from the source device 110 to the target device 150, where the source device 110 contacts the MNO server 702 to initiate the transfer. The cellular service account to be transferred can include a SIM/eSIM with which the source device 110 previously paired with the MNO server 702 for which a trust relationship exists based on a generated and stored shared secret key (SK). at 793, the MNO server 702 can determine whether there exists a valid SK for a SIM/eSIM to be transferred (and its associated phone number). When there does exist a valid SK (with an implied trust relationship), the MNO server 702 can determine whether the source device 110, which paired with the MNO server 702 using the SIM/eSIM previously, continues to possess the SK associated with the SIM/eSIM. At 794, the MNO server 702 issues an authentication challenge to the source device 110 based on a random (RAND) value. At 795, the source device 110 provides to the MNO server 702 a challenge response based on the RAND value and the SK value. At 796, the MNO server 702 concludes that the challenge response is valid, and at 798 the MNO server provides an indication to the source device 110 that a cellular service account including the SIM/eSIM will transfer to the target device 150.

Representative Exemplary Apparatus

Figure 8:
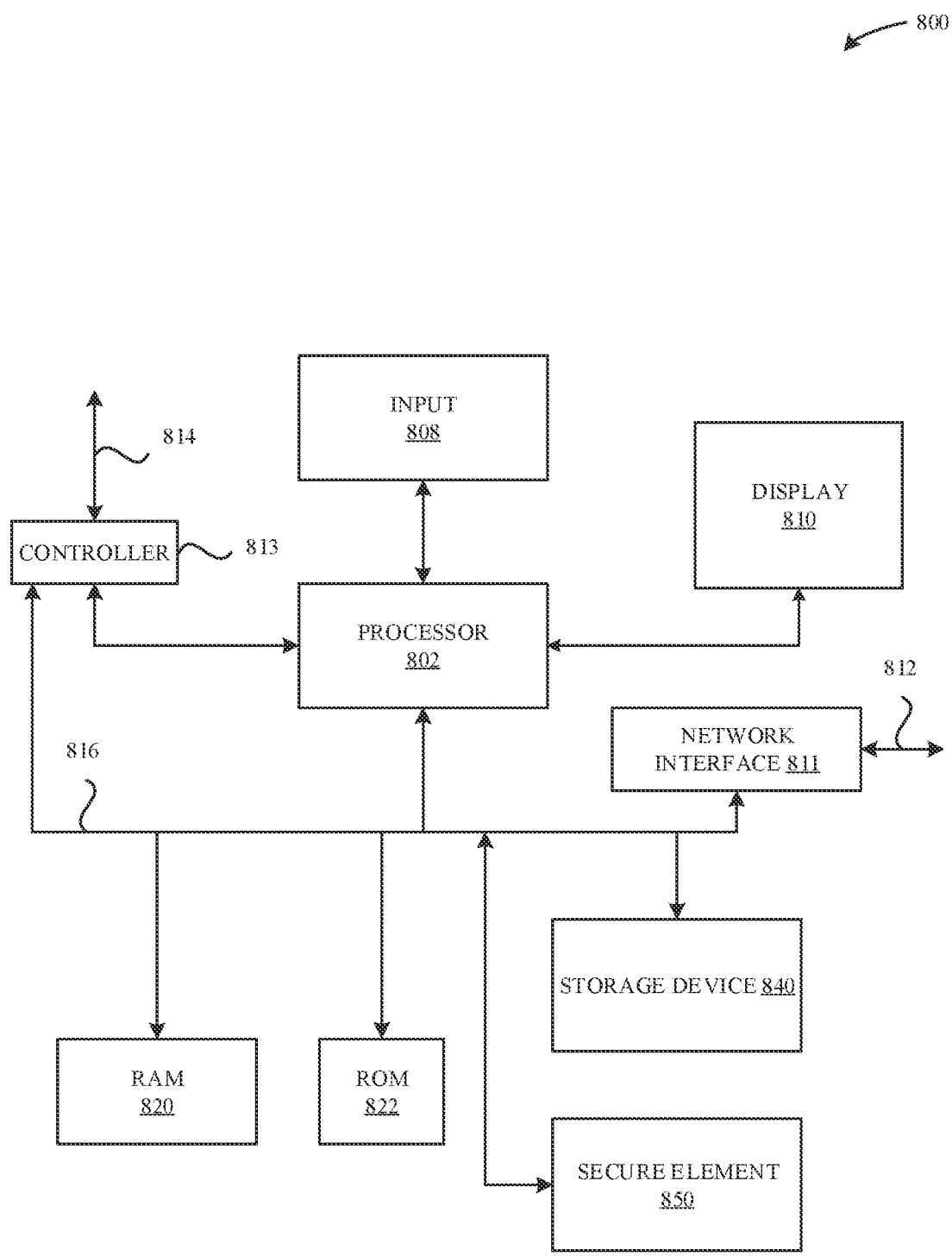
FIG. 8 illustrates a block diagram of exemplary elements of a mobile wireless device, according to some embodiments.

FIG. 8 illustrates in block diagram format an exemplary computing device 800 that can be used to implement the various components and techniques described herein, according to some embodiments. In particular, the detailed view of the exemplary computing device 800 illustrates various components that can be included in the source device 110 and/or the target device 150. As shown in FIG. 8, the computing device 800 can include a processor 802 that represents a microprocessor or controller for controlling the overall operation of computing device 800. In some embodiments, the computing device 800 can also include a user input device 808 that allows a user of the computing device 800 to interact with the computing device 800. For example, in some embodiments, the user input device 808 can take a variety of forms, such as a button, keypad, dial, touch screen, audio input interface, visual/image capture input interface, input in the form of sensor data, etc. In some embodiments, the computing device 800 can include a display 810 (screen display) that can be controlled by the processor 802 to display information to the user (for example, information relating to incoming, outgoing, or active communication sessions). A data bus 816 can facilitate data transfer between at least a storage device 840, the processor 802, and a controller 813. The controller 813 can be used to interface with and control different equipment through an equipment control bus 814. The computing device 800 can also include a network/bus interface 811 that couples to a data link 812. In the case of a wireless connection, the network/bus interface 811 can include wireless circuitry, such as a wireless transceiver and/or baseband processor. The computing device 800 can also include a secure element 850. The secure element 850 can include an eUICC and/or UICC.

The computing device 800 also includes a storage device 840, which can include a single storage or a plurality of storages (e.g., hard drives), and includes a storage management module that manages one or more partitions within the storage device 840. In some embodiments, storage device 840 can include flash memory, semiconductor (solid state) memory or the like. The computing device 800 can also include a Random-Access Memory (RAM) 820 and a Read-Only Memory (ROM) 822. The ROM 822 can store programs, utilities or processes to be executed in a non-volatile manner. The RAM 820 can provide volatile data storage, and stores instructions related to the operation of the computing device 800.

Representative Embodiments

In some embodiments, a method for cellular service account transfer and authentication includes, at a target device: establishing a secure connection with a source device via a proximity sharing feature; obtaining cellular service plan description and authentication data for one or more electronic subscriber identity modules (eSIMs) from the source device via the secure connection; and triggering, after obtaining user consent, direct installation of at least one of the one or more eSIMs to the target device from a server of a mobile network operator (MNO), where the target device and the source device are associated with a common user account.

In some embodiments, the authentication data includes at least one transfer token obtained by the source device from the server of the MNO. In some embodiments, the authentication data includes at least one trust flag that indicates a trust relationship between an eSIM of the one or more eSIMs and the source device. In some embodiments, the authentication data obviates a requirement for the target device to perform a cellular service user account login procedure with a web-sheet server of the MNO. In some embodiments, the method further includes, at the target device: presenting, via a user interface of the target device, a listing on the one or more eSIMs; and obtaining, via the user interface of the target device, a selection of the at least one of the one or more eSIMs to transfer to the target device. In some embodiments, the method further includes, at the target device, performing a setup procedure for the one or more eSIMs installed on the target device to configure one or more associated cellular service plans. In some embodiments, the method further includes, at the target device: receiving, from the server of the MNO, a redirection to a web-sheet server of the MNO; authenticating with the web-sheet server based on a cellular service account login and password; obtaining cellular service plan terms and conditions from the web-sheet server; and providing an indication of consent to the cellular service plan terms and conditions to the web-sheet server.

In some embodiments, a method for cellular service account transfer and authentication includes, at an entitlement server of a mobile network operator (MNO): providing, to a source device, authentication data for transfer of one or more electronic subscriber identity modules (eSIMs); receiving, from a target device, a request to transfer at least one eSIM of the one or more eSIMs, the request including at least a portion of the authentication data; and responsive to successful authentication of the target device based on the at least a portion of the authentication data: obtaining, from a provisioning server, at least one identifier corresponding to the at least one eSIM to be transferred to the target device; and providing, to the target device, the at least one identifier corresponding to the at least one eSIM and a network address for the provisioning server.

In some embodiments, the authentication data includes at least one transfer token. In some embodiments, the method further includes, at the entitlement server, obtaining the at least one transfer token from an authorization server. In some embodiments, the authentication data includes at least one trust flag that indicates a trust relationship between an eSIM of the one or more eSIMs and the source device. In some embodiments, the authentication data obviates a requirement for the target device to perform a cellular service user account login procedure with a web-sheet server of the MNO. In some embodiments, the method further includes, at the entitlement server, communicating with one or more back-end servers of the MNO to provision the at least one eSIM to the target device. In some embodiments, the method further includes, at the entitlement server, updating a push notification token for the target device to correspond to an international mobile subscription identifier (IMSI) for an eSIM of the at least one eSIM transferred to the target device.

In some embodiments, a method for cellular service account transfer and authentication includes, at a source device: establishing a secure connection with a target device via a proximity sharing feature; receiving a request for information regarding electronic subscriber identity modules (eSIMs) transferable from the source device to the target device; obtaining, from an entitlement server of a mobile network operator (MNO), authentication data for transferring one or more eSIMs; and providing, to the target device via the secure connection, cellular service plan description and authentication data for the one or more eSIMs, where the target device and the source device are associated with a common user account.

In some embodiments, the authentication data includes at least one transfer token. In some embodiments, the authentication data includes at least one trust flag that indicates a trust relationship between an eSIM of the one or more eSIMs and the source device. In some embodiments, the authentication data obviates a requirement for the target device to perform a cellular service user account login procedure with a web-sheet server of the MNO. In some embodiments, the method further includes, at the source device, receiving an indication that at least one eSIM of the one or more eSIMs has been transferred to the target device. In some embodiments, the method further includes, at the source device, disabling baseband circuitry of the source device when transfer of the at least one eSIM results in no active eSIMs remaining at the source device.

Wireless Terminology

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode user equipment (UE) can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for cellular service user subscription account transfer from a source device to a target device, the method comprising:
   by the target device:
   obtaining, from a cloud-network service, authentication data for one or more electronic subscriber identity modules (eSIMs) associated with the cellular service user subscription, wherein:
      the authentication data includes a trust flag that indicates a trust relationship established between a cellular service user account of a mobile network operator (MNO) and the source device, and
      the authentication data for the one or more eSIMs was previously uploaded to the cloud-network service;
   sending, to an entitlement server of the MNO, at least a portion of the authentication data including the trust flag to:
      authenticate the target device,
      identify the cellular service user subscription to transfer, and indicate authority to transfer the cellular service user subscription to the target device; and
   downloading and installing, after obtaining authorization to transfer from the entitlement server, at least one of the one or more eSIMs to the target device from a provisioning server of the MNO.

2. The method of claim 1, wherein the authentication data includes at least one transfer token obtained by the source device from the entitlement server of the MNO.

3. The method of claim 1, further comprising:
   by the target device:
   presenting, via a user interface of the target device, a listing of the one or more eSIMs; and
   obtaining, via the user interface of the target device, a selection of the at least one of the one or more eSIMs to transfer to the target device.

4. The method of claim 1, further comprising:
   by the target device:
   receiving, from the entitlement server of the MNO, a redirection to a web-sheet server of the MNO; and
   authenticating with the web-sheet server based on a cellular service user account login and password.

5. The method of claim 1, wherein the target device and the source device are associated with a common user account.

6. The method of claim 5, wherein the common user account is associated with the cloud-network service.

7. The method of claim 1, wherein the at least one of the one or more eSIMs comprises at least two eSIMs associated with a common cellular service user account of the MNO.

8. The method of claim 1, further comprising:
   by the target device:
   sending, to a second entitlement server of a second MNO, at least a portion of the authentication data including a second trust flag to:
      authenticate the target device,
      identify a second cellular service user subscription to transfer, and
      indicate authority to transfer the second cellular service user subscription to the target device; and
   downloading and installing, after obtaining authorization to transfer from the second entitlement server, another one or more of the one or more eSIMs to the target device from a second provisioning server of the second MNO,
   wherein the second trust flag indicates a second trust relationship established between a second cellular service user account of the second MNO and the source device.

9. The method of claim 1, further comprising:
   by the target device:
   sending, to the source device, a notification indicating that the at least one of the one or more eSIMs is active on the target device.

10. The method of claim 1, further comprising:
    by the target device:
    receiving, from the entitlement server after installation and activation of an eSIM of the at least one of the one or more eSIMs, an authentication challenge; and
    providing, to the entitlement server, a challenge response using a secret key (SK) associated with the eSIM,
    wherein a valid challenge response validates a trust relationship for the SK and associates the trust relationship with the target device.

11. A method for cellular service user subscription transfer from a source device to a target device, the method comprising:
    by the source device:
    receiving, via a user interface input, an indication to enable transfer of the cellular service user subscription associated with a mobile network operator (MNO); and
    uploading, to a cloud-network service, authentication data obtained from an entitlement server of the MNO for transfer of one or more electronic subscriber identity modules (eSIMs) associated with the cellular service user subscription,
    wherein:
       the authentication data includes a trust flag that indicates a trust relationship established between a cellular service user account of the MNO and the source device, and
       the authentication data allows the target device to authenticate with the entitlement server of the MNO and to indicate authority to transfer the cellular service user subscription.

12. The method of claim 11, further comprising:
by the source device:
obtaining, from an authorization server of the MNO, a transfer access token for an eSIM of the one or more eSIMs associated with the cellular service user subscription,
wherein the authentication data further includes the transfer access token for the eSIM.

13. The method of claim 11, further comprising:
by the source device:
receiving an indication that at least one eSIM of the one or more eSIMs has been transferred to the target device.

14. The method of claim 11, further comprising:
by the source device:
generating and retaining the trust relationship with an entitlement server of the MNO based on providing successful challenge responses to authentication challenges based on a secret key (SK) shared with the entitlement server.

15. A target device configured for cellular service user subscription transfer, the target device comprising:
one or more antennas; and
processing circuitry communicatively coupled to the one or more antennas and comprising at least one processor communicatively coupled to a memory storing instructions that, when executed by the at least one processor, configure the target device to perform operations including:
obtaining, from a cloud-network service, authentication data for one or more electronic subscriber identity modules (eSIMs) associated with the cellular service user subscription,
wherein:
the authentication data includes a trust flag that indicates a trust relationship established between a cellular service user account of a mobile network operator (MNO) and a source device, and
the authentication data for the one or more eSIMs was previously uploaded to the cloud-network service;
sending, to an entitlement server of the MNO, at least a portion of the authentication data including the trust flag to:
authenticate the target device,
identify the cellular service user subscription to transfer, and indicate authority to transfer the cellular service user subscription to the target device; and
downloading and installing, after obtaining authorization to transfer from the entitlement server, at least one of the one or more eSIMs to the target device from a provisioning server of the MNO.

16. The target device of claim 15, wherein the target device is further configured to perform additional operations including:
presenting, via a user interface of the target device, a listing of the one or more eSIMs; and
obtaining, via the user interface of the target device, a selection of the at least one of the one or more eSIMs to transfer to the target device.

17. The target device of claim 15, wherein the target device is further configured to perform additional operations including:
receiving, from the entitlement server of the MNO, a redirection to a web-sheet server of the MNO; and
authenticating with the web-sheet server based on a cellular service user account login and password.

18. The target device of claim 15, wherein the target device and the source device are associated with a common user account of the cloud-network service.

19. The target device of claim 15, wherein the at least one of the one or more eSIMs comprises at least two eSIMs associated with a common cellular service user account of the MNO.

20. The target device of claim 15, wherein the target device is further configured to perform additional operations including:
receiving, from the entitlement server after installation and activation of an eSIM of the at least one of the one or more eSIMs, an authentication challenge; and
providing, to the entitlement server, a challenge response using a secret key (SK) associated with the eSIM,
wherein a valid challenge response validates a trust relationship for the SK and associates the trust relationship with the target device.

* * * * *

UNITED STATES PATENT AND TRADEMARK OFFICE
CERTIFICATE OF CORRECTION

| | | |
|---|---|---|
| PATENT NO. | : 11,671,833 B2 | Page 1 of 1 |
| APPLICATION NO. | : 18/049271 | |
| DATED | : June 6, 2023 | |
| INVENTOR(S) | : Sherman X. Jin et al. | |

It is certified that error appears in the above-identified patent and that said Letters Patent is hereby corrected as shown below:

In the Specification

At Column 6, Line 57: "value, and an indication that an ICCID' s state will" should read -- value, and an indication that an ICCID's state will --.

At Column 7, Line 43: "using cellular service via the MNO' s network using cre-" should read -- using cellular service via the MNO's network using cre- --.

In the Claims

In Claim 1, at Column 27, Line 29: "A method for cellular service user subscription account" should read -- A method for cellular service user subscription --.

Signed and Sealed this
Fifth Day of December, 2023

Katherine Kelly Vidal
*Director of the United States Patent and Trademark Office*